US009363590B2

(12) United States Patent
Hiramoto et al.

(10) Patent No.: US 9,363,590 B2
(45) Date of Patent: Jun. 7, 2016

(54) PLAYBACK DEVICE

(71) Applicant: Sony Corporation, Tokyo (JP)

(72) Inventors: Yukio Hiramoto, Kanagawa (JP); Yousuke Tsukumori, Chiba (JP)

(73) Assignee: SONY CORPORATION, Tokyo (JP)

( * ) Notice: Subject to any disclaimer, the term of this patent is extended or adjusted under 35 U.S.C. 154(b) by 163 days.

(21) Appl. No.: 14/060,786

(22) Filed: Oct. 23, 2013

(65) Prior Publication Data

US 2014/0119566 A1 May 1, 2014

(30) Foreign Application Priority Data

Nov. 1, 2012 (JP) ................................ 2012-241908

(51) Int. Cl.

*H04B 1/00* (2006.01)
*H04R 1/02* (2006.01)
*H04R 9/06* (2006.01)
*H04R 1/28* (2006.01)
*H04R 5/04* (2006.01)

(52) U.S. Cl.

CPC .............. *H04R 1/025* (2013.01); *H04R 1/2819* (2013.01); *H04R 1/2834* (2013.01); *H04R 5/04* (2013.01); *H04R 2400/03* (2013.01); *H04R 2420/07* (2013.01); *H04R 2499/13* (2013.01)

(58) Field of Classification Search

None

See application file for complete search history.

(56) References Cited

U.S. PATENT DOCUMENTS

2008/0247593 A1* 10/2008 Sprinkle ...................... 381/387

FOREIGN PATENT DOCUMENTS

| | | | |
|---|---|---|---|
| JP | 2003-250199 | A | 9/2003 |
| JP | 2004-343453 | A | 12/2004 |
| JP | 2006-186925 | A | 7/2006 |
| JP | 2009-159120 | A | 7/2009 |
| JP | 2011-091666 | A | 5/2011 |

* cited by examiner

*Primary Examiner* — Regina N Holder

(74) *Attorney, Agent, or Firm* — Chip Law Group

(57) ABSTRACT

A playback device including: a housing: an attachment portion to a first position on an attachment surface; a speaker that plays back sound in a predetermined direction in accordance with a first audio signal having a first band; and a vibration portion that vibrates in accordance with a second audio signal having a second band that is lower than the first band, the vibration portion having an abutment surface that abuts at a second position on the attachment surface. The attachment member, the speaker, and the vibration portion are attached to the housing.

15 Claims, 19 Drawing Sheets

PLAYBACK DEVICE

CROSS REFERENCE TO RELATED APPLICATIONS

This application claims the benefit of Japanese Priority Patent Application JP 2012-241908 filed Nov. 1, 2012, the entire contents of which are incorporated herein by reference.

BACKGROUND OF THE INVENTIONS

The present disclosure relates to a playback device.

It has been proposed to play back sound using a speaker that is different from speakers provided in a vehicle. For example, Japanese Unexamined Patent Application Publication No. 2006-186925 describes a technology in which a speaker placed on a dashboard of a vehicle is used as a center speaker to play back sound from the center speaker.

BRIEF SUMMARY OF THE INVENTION

A speaker that is small enough to be placed on a dashboard of a vehicle may not fully play back low sound in particular. Further, if sound is played back toward a listener using a small speaker, it may be difficult to provide a sound field with presence.

Thus, it is desirable to provide a playback device that addresses the issue described above.

In order to address the foregoing issue, the present disclosure provides, for example, a playback device including: a housing: an attachment portion to a first position on an attachment surface; a speaker that plays back sound in a predetermined direction in accordance with a first audio signal having a first band; and a vibration portion that vibrates in accordance with a second audio signal having a second band that is lower than the first band, the vibration portion having an abutment surface that abuts at a second position on the attachment surface, the attachment member, the speaker, and the vibration portion being attached to the housing.

According to at least one embodiment, it is possible to play back sound based on an audio signal with high quality from a low register to a mid-to-high register.

DETAILED DESCRIPTION

Embodiments of the present disclosure will be described below with reference to the drawings. The description will be made in the following order.

<1. First Embodiment>

<2. Second Embodiment>

<3. Modification>

The embodiments etc. described below are suitable specific examples of the present disclosure, and the present disclosure is not limited thereto. Further, expressions that prescribe directions such as up, down, left, right, etc. are used in consideration of the convenience of description in the following description. However, the present disclosure is not limited to such directions.

1. First Embodiment

"Overview of Embodiment"

Figure 1:
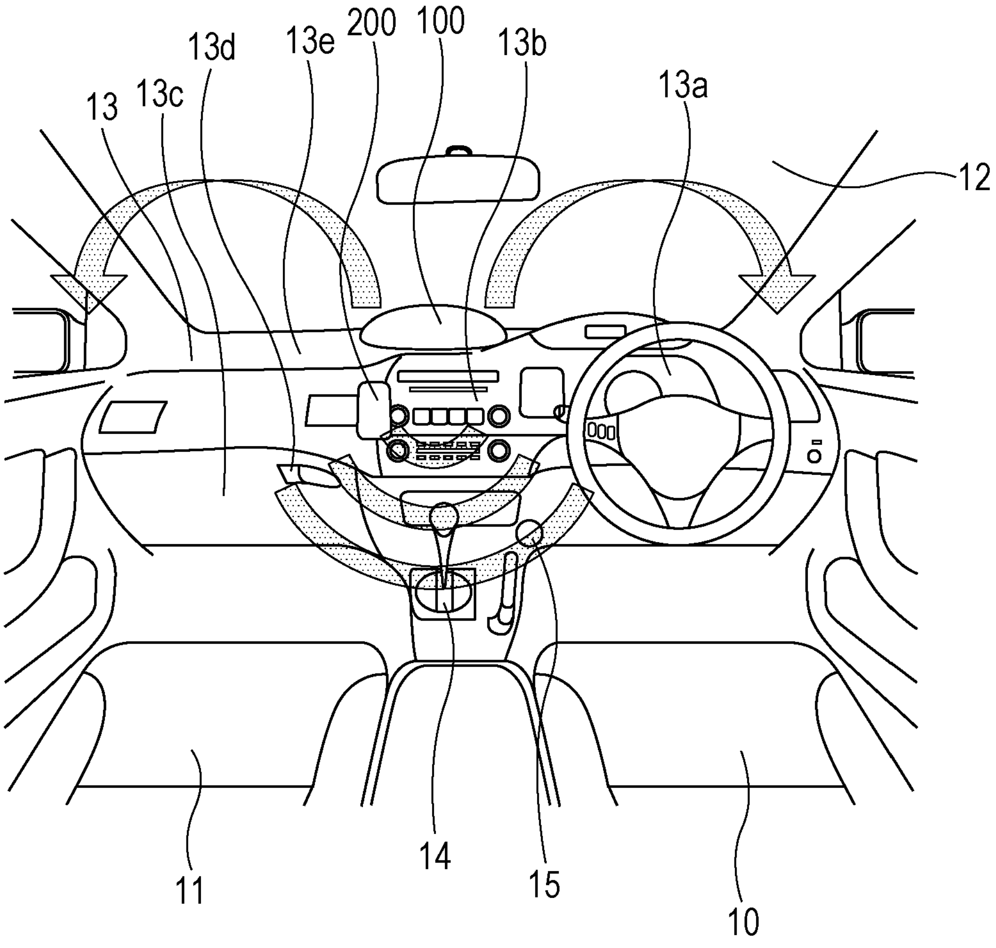
FIG. 1 illustrates an overview of a first embodiment.

First, an overview of a first embodiment of the present disclosure will be described. A playback device illustrated in the embodiment is attached inside a vehicle such as an automobile, for example. FIG. 1 illustrates an example of components provided inside the vehicle. A driver's seat 10 and a passenger seat 11 (which may be referred to collectively as "front seats") are disposed inside the vehicle. A dashboard 13 is disposed under a windshield 12 provided in front of the front seats. The surface of the dashboard 13 serves as an example of the attachment surface.

The windshield is occasionally referred to as a "front window". Further, the dashboard is occasionally referred to as an "instrument panel". In the embodiment, the dashboard 13 is formed to extend from the front of the driver's seat 10 to the front of the passenger seat 11, and may be named differently.

Instruments etc. are disposed in the dashboard 13. To give some examples, instruments 13*a* such as a speedometer and a tachometer are disposed in the dashboard 13 in front the driver's seat 10. An operation input portion 13*b* that allows operation of an air conditioner and audio playback is disposed in the center of the dashboard 13.

A glove compartment 13*c* that serves as an example of the housing space is formed inside the dashboard 13 in front of the passenger seat 11. The glove compartment 13*c* is exposed by moving a part of the dashboard 13 downward, for example, while pulling a lever 13*d* disposed in the dashboard 13. An operation manual of the vehicle etc. is housed in the glove compartment 13*c*. A part of the dashboard 13 has a flat surface (a surface that is generally parallel to the bottom surface of the vehicle). The flat surface is referred to as a "planar surface portion 13*e*" as appropriate.

A shift lever 14 is disposed between the driver's seat 10 and the passenger seat 11. A cigar socket 15 is disposed in the vicinity of the shift lever 14 so that electric power may be supplied from the vehicle system to a device connected to the cigar socket 15.

A playback device 100 is attached to the flat surface portion 13*e* generally in the center of the dashboard 13. The playback device 100 is attached generally in the center of the dashboard 13 by attaching a suction cup that serves as an example of the attachment portion to the flat surface portion 13*e* and engaging the suction cup and a housing of the playback device 100 with each other, for example. After the playback device 100 is used, the housing of the playback device 100 and the suction cup are disengaged from each other to remove the housing of the playback device 100 from the suction cup. Then, the suction cup is removed from the flat surface portion 13*e*.

The playback device 100 is removably attachable to the surface of the dashboard 13 through use of the suction cup, for example. The playback device 100 is sized so as to be portable by a user. The playback device 100 includes two speakers corresponding to a left (L) channel and a right (R) channel, for example. The two speakers operate in accordance with an audio signal for a mid-to-high register, for example, and play back sound toward the windshield 12. The sound played back is reflected by the windshield 12 to be heard by a listener such as a driver. The windshield 12 reverberates the sound such that the sound is heard with a sense of expansion, providing the listener with a sound field with presence.

The playback device 100 further includes a vibration unit including a magnet and a coil, for example. A surface (abutment surface) of the vibration unit abuts against a part of the surface of the dashboard 13. The vibration unit vibrates in accordance with an audio signal for a low register. Vibration of the vibration unit is transmitted to the dashboard 13 to vibrate the dashboard 13. Vibration of the dashboard 13 vibrates air, producing audio sound in the low register to be heard by the listener. The dashboard 13 is used as if it were an enclosure of a speaker, allowing playback of audio sound in the low register that may not be fully played back by a small speaker. In FIG. 1 (and also in FIG. 20 to be discussed later), the audio sound played back is schematically illustrated by hatched arrows etc.

An audio signal for the audio sound played back for the listener such as the driver is supplied from a portable terminal 200 to the playback device 100, for example. The audio signal is supplied from the portable terminal 200 to the playback device 100 with the portable terminal 200 and the playback device 100 connected to each other through a predetermined near-field wireless communication scheme. In the example, "Bluetooth (registered trademark)" is used as the predetermined near-field wireless communication scheme. Communication through "Zigbee (registered trademark)" or "Wi-Fi (registered trademark)" may also be used. As a matter of course, the communication scheme is not limited to wireless communication, and the portable terminal 200 and the playback device 100 may be connected through wired communication so that the audio signal is transferred via a wire. However, wireless communication that uses no wire is preferable.

A memory such as a USB memory may be removably attachable to the playback device 100 so that sound based on an audio signal stored in the memory may be played back, for example. An audio signal may be supplied via the Internet so that sound based on the supplied audio signal may be played back.

The playback device 100 is supplied with electric power from the power system of the vehicle, for example. The playback device 100 includes a power cable (not illustrated) that is connectable to the cigar socket 15 to supply electric power to the playback device 100. The playback device 100 includes a chargeable secondary battery, for example. The secondary battery is charged by electric power supplied from the vehicle system. The playback device 100 may operate on a primary battery or a solar battery rather than the secondary battery.

The portable terminal 200 may be a cellular phone, a smartphone, a portable audio player, a tablet computer, or the like. The portable terminal 200 is attached generally in the center of the dashboard 13 using a predetermined attachment member, for example. The portable terminal 200 may not necessarily be attached to the dashboard 13, and may be held by the user.

A memory that may be built in or removably attachable to the portable terminal 200 stores a plurality of audio signals. As discussed above, all or some of the plurality of audio signals are supplied to the playback device 100 to be played back by the playback device 100.

"Overview of Playback Device"

Figure 2:
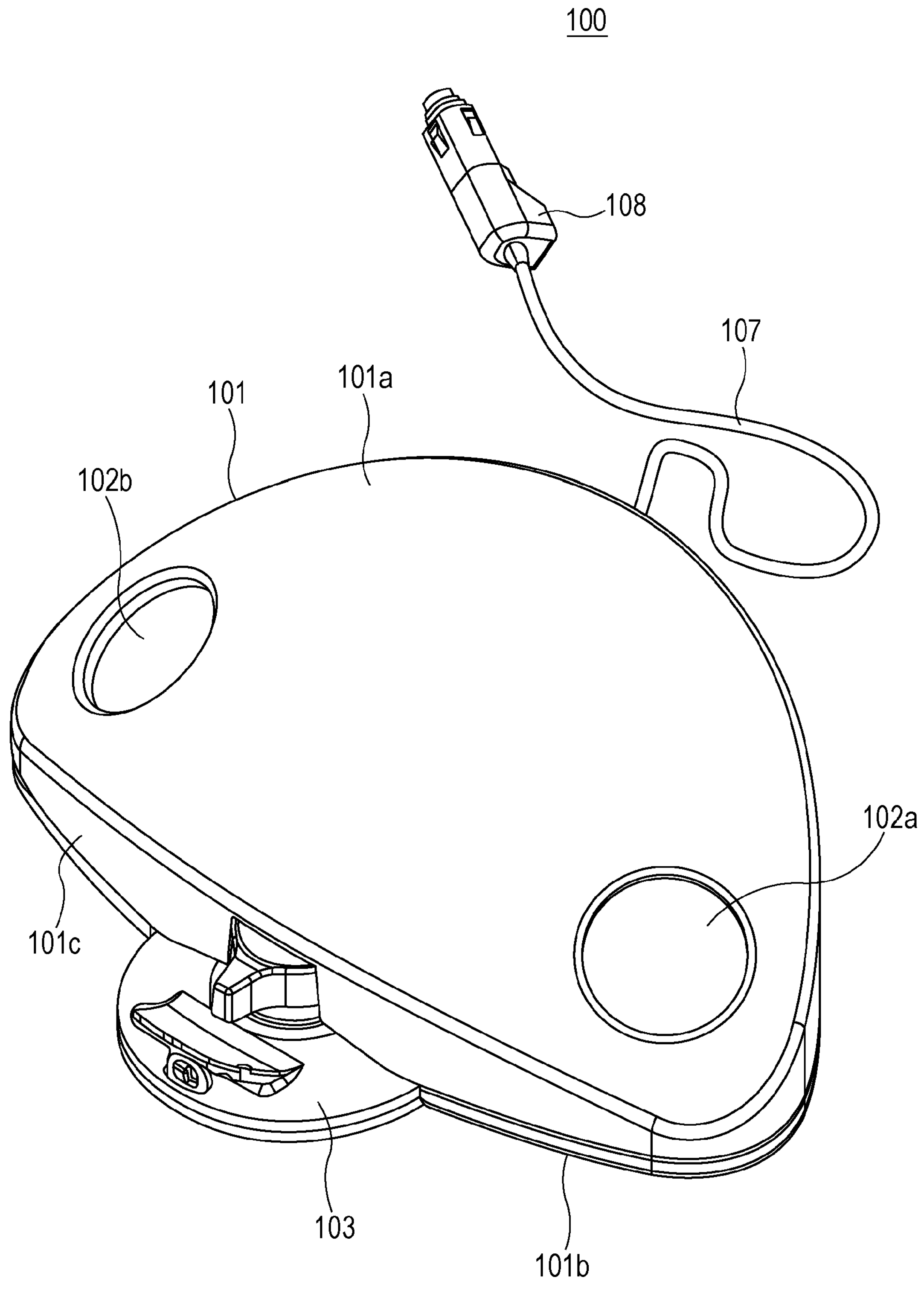
FIG. 2 is a perspective view illustrating an example of the appearance of a playback device according to the first embodiment.

Next, an example of the playback device 100 will be described. FIG. 2 is a perspective view illustrating an example of the appearance of the playback device 100. The playback device 100 includes a housing 101 including a top surface 101*a*, a bottom surface 101*b*, and a peripheral surface 101*c*. The top surface 101*a* of the housing 101 is inclined so as to be different in height with respect to the bottom surface 101*b*, for example. To use the playback device 100, the housing 101 is attached to the dashboard 13 such that the top surface 101*a* and the windshield 12 are generally parallel to each other.

A speaker 102*a* for the L channel and a speaker 102*b* for the R channel are attached near end portions of the top surface 101*a* on the lower side. Mechanisms of the speakers are housed inside the housing 101. With the speaker 102*a* and the speaker 102*b* attached, the inside of the housing 101 is tightly sealed as with speakers. A hole (duct) for boosting low sound may be formed in a predetermined location of the housing 101 as with bass-reflex speakers. Further, a passive radiator for boosting low sound may be attached to the top surface 101*a*. For example, the passive radiator may be attached between the speaker 102*a* and the speaker 102*b*. The playback device 100 is attached to the dashboard 13 such that the speaker 102*a* and the speaker 102*b* are directed toward the windshield 12.

In the following description, a tightly sealed space formed in the housing 101 is referred to as the inside of the housing 101. Of the spaces partitioned by the surfaces forming the housing 101, the space inside the housing 101 is referred to as the inside of the housing 101, and the space outside the housing 101 is referred to as the outside of the housing 101. Besides the tightly sealed space discussed above, a space housing the vibration unit to be discussed later and mechanisms that attach the suction cup to the housing 101 are disposed inside the housing 101.

A power cable 107 extends from a predetermined location of the peripheral surface 101*c* of the housing 101. An end of the power cable 107 is connected to a power source portion of the playback device 100. The power source portion of the playback device 100 is a chargeable secondary battery, for example, and supplies electric power to electrical components of the playback device 100. A socket 108 is attached to the other end (distal end) of the power cable 107. The socket 108 is attached to the cigar socket 15 to supply electric power from the vehicle system to the playback device 100.

The housing 101 is attached to a suction cup 103 that serves as an example of the attachment portion. The suction cup 103 is removably attachable to the housing 101, and attached generally in the center of the dashboard 13, for example. An example of a method of attaching the suction cup 103 to the dashboard 13 will be discussed later. A part of the suction cup 103 is attached to the inside of the housing 101 by depressing the housing 101 with respect to the suction cup 103 attached to the dashboard 13, sliding the housing 101 with respect to the suction cup 103, or the like.

"Configuration of Playback Device"

Figure 3:
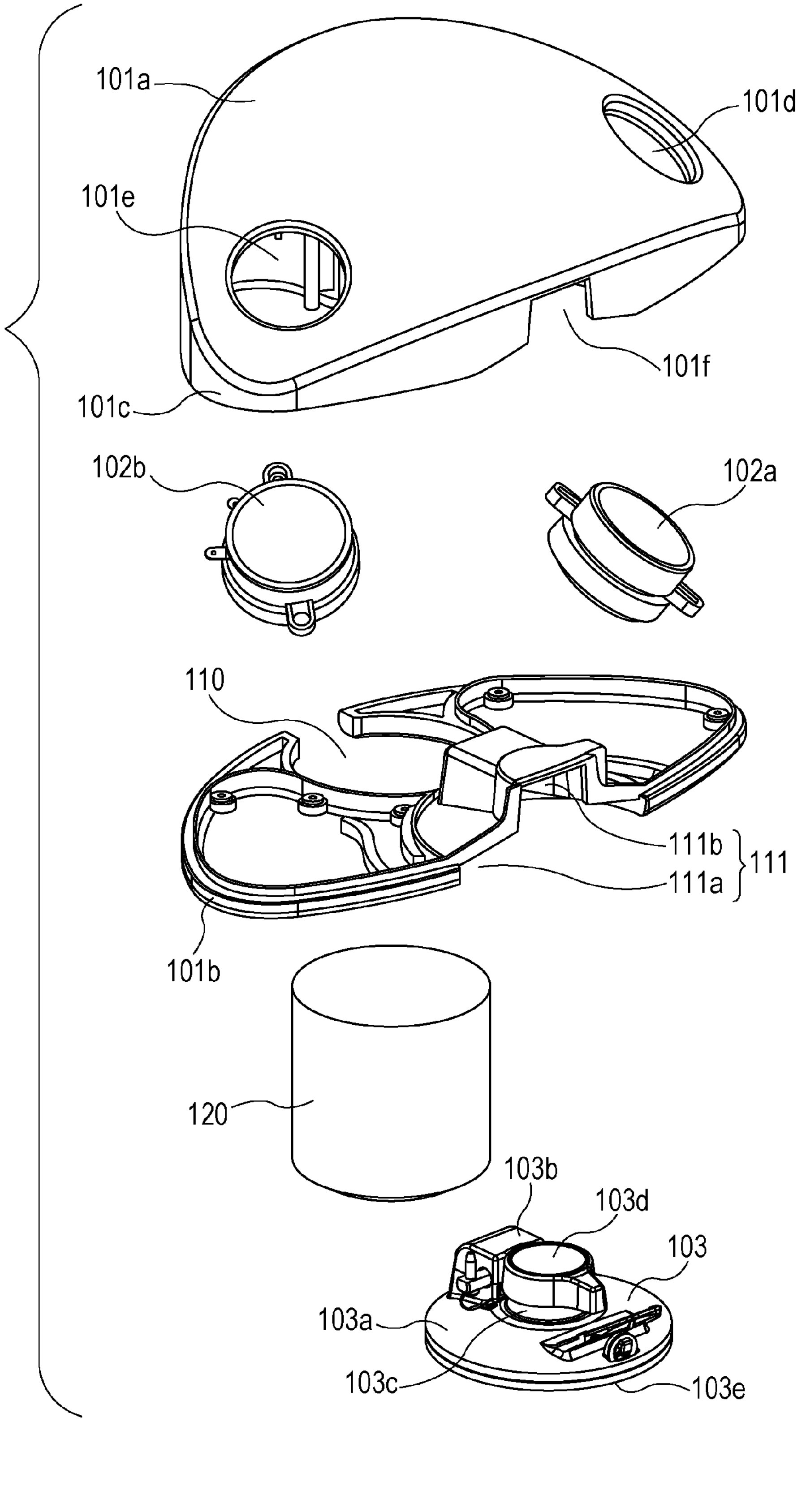
FIG. 3 is an exploded perspective view illustrating an example of the configuration of the playback device according to the first embodiment.

FIG. 3 is an exploded perspective view of the playback device 100. In FIG. 3 etc. to be described below, the power cable 107 and the socket 108 are not illustrated as appropriate. The top surface 101*a* and the peripheral surface 101*c*, for example, of the housing 101 are formed integrally with each other. An opening 101*d* and an opening 101*e* are formed in the top surface 101*a*. The speaker 102*a* and the speaker 102*b* are attached to close the opening 101*d* and the opening 101*e*, respectively. An opening 101*f* corresponding to the shape of the suction cup 103 is formed in the peripheral surface 101*c*. The opening 101*f* may not necessarily be formed depending on the shape of the suction cup 103.

The bottom surface 101*b* is attached to the top surface 101*a* and the peripheral surface 101*c*, which are formed integrally with each other, using screws, for example. The housing 101 is tightly sealed by attaching the speaker 102*a* and the speaker 102*b* and further attaching the bottom surface 101*b*. Although not illustrated, electrical components that performs a process on an audio signal etc. are housed inside the housing 101. The electrical configuration of the playback device 100 will be discussed in detail later.

A housing portion that houses the vibration unit 120 is formed inside the housing 101. The vibration unit 120 has a generally cylindrical shape, for example, and functions as a voice coil provided in a common speaker. A low-register component of the audio signal is supplied to the vibration unit 120 to vibrate the vibration unit 120 in accordance with the low-register audio signal. A notch 110 having a generally circular shape corresponding to the shape of the vibration unit 120 is formed in the bottom surface 101*b* of the housing 101. The vibration unit 120 is housed in the housing portion formed from the notch 110 and a space above the notch 110. The vibration unit 120 is fixed so as to be able to vibrate. The bottom surface (abutment surface) of the vibration unit 120 abuts against the surface of the dashboard 13 via the notch 110.

Further, a mount portion 111 is formed in the housing 101. The mount portion 111 houses a part of the suction cup 103 inside the housing 101, and allows the suction cup 103 to be mounted to the housing 101. The mount portion 111 includes a generally semicircular notch 111*a* formed in the bottom surface 101*b*, and a recessed portion 111*b* formed to be continuous with the bottom surface 101*b* to extend upward from the bottom surface 101*b*, for example. The recessed portion 111*b* is more or less deformable. The size of the recessed portion 111*b* is generally the same as the size of a projecting portion 103*b* of the suction cup 103 to be discussed later. The housing portion which houses the vibration unit 120 and the mount portion 111 for mounting of the suction cup 103 are different from the tightly sealed space formed by the housing 101.

The suction cup 103 includes a generally circular base 103*a*, the projecting portion 103*b* which projects upward from a location near an end portion of the base 103*a*, a center shaft 103*c* that stands straight upward generally from the center of the base 103*a*, a lock lever 103*d* coupled to the distal end of the center shaft 103*c*, and a suction layer 103*e* formed on the bottom surface of the base 103*a*. The suction cup 103 is attached to the dashboard 13 with the suction layer 103*e* tightly adhering to a predetermined position on the surface of the dashboard 13. The suction cup 103 will be discussed in detail later.

The housing 101 and the suction cup 103 are engaged with each other by inserting the projecting portion 103*b* of the suction cup 103 into the recessed portion 111*b* inside the housing 101 with a predetermined pressure. In an example, the suction cup 103 is first attached to the dashboard 13, and thereafter the projecting portion 103*b* is inserted into the recessed portion 111*b* such that the housing 101 covers the suction cup 103 from above. The projecting portion 103*b* may be inserted into the recessed portion 111*b* by sliding the housing 101. With the projecting portion 103*b* inserted into the recessed portion 111*b*, the housing 101 and the suction cup 103 are engaged with each other with a predetermined strength.

Figure 4:
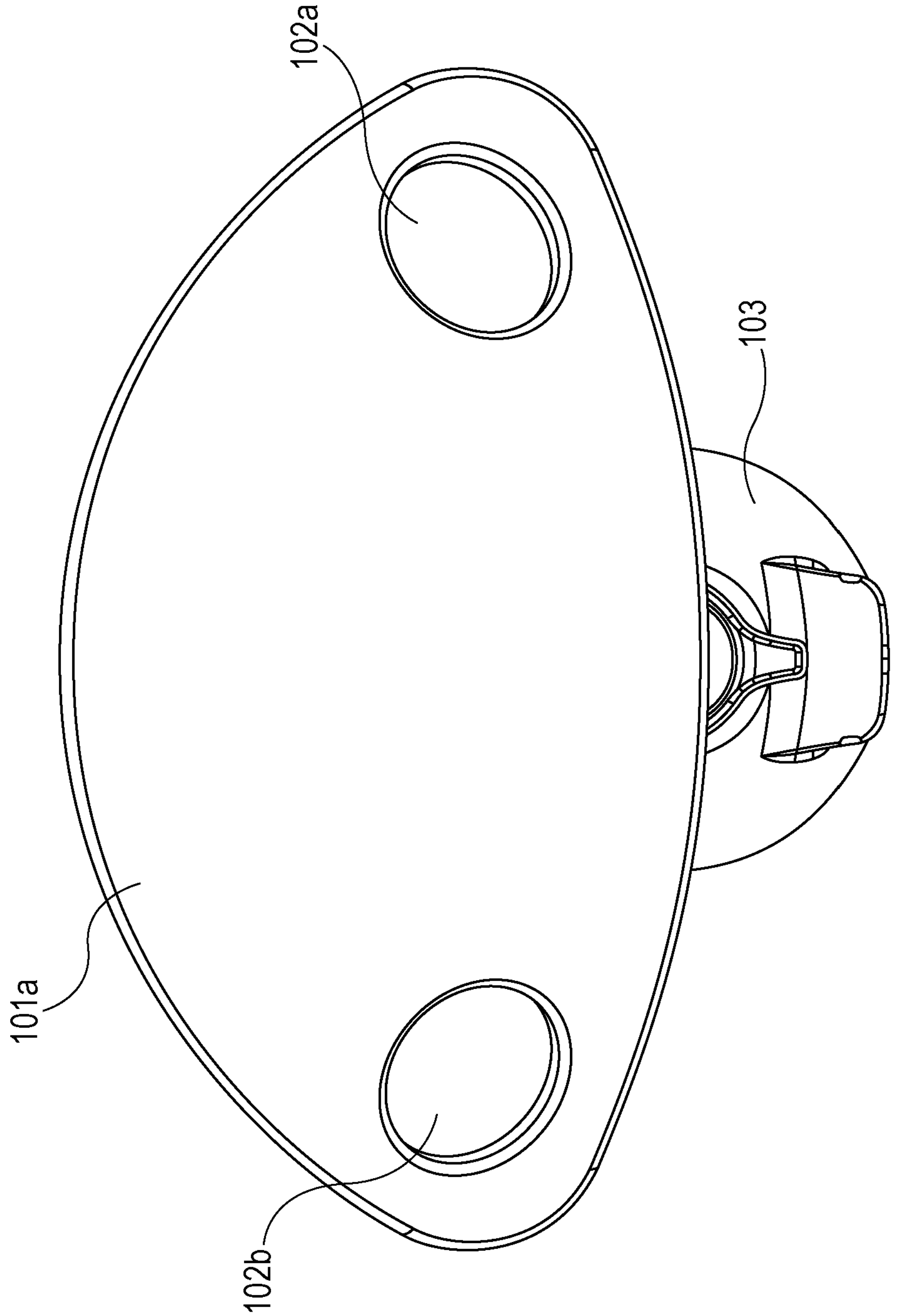
FIG. 4 is a plan view illustrating an example of the appearance of the playback device according to the first embodiment.

FIG. 4 is a plan view of the playback device 100. As discussed above, the speaker 102*a* and the speaker 102*b* are attached to the top surface 101*a* of the housing 101. Further, the suction cup 103 is mounted to the housing 101.

Figure 5:
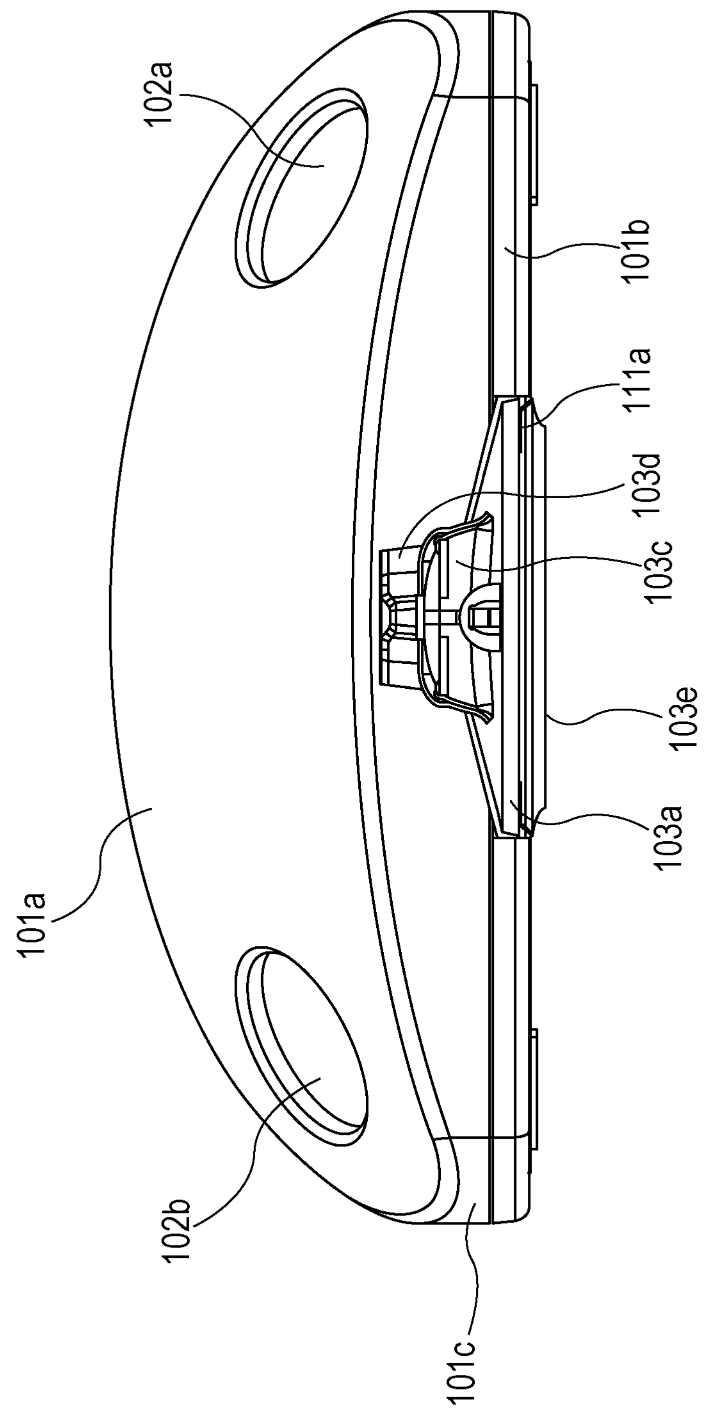
FIG. 5 is a front view illustrating an example of the appearance of the playback device according to the first embodiment.

FIG. 5 is a front view of the playback device 100. The diameter of the notch 111*a* formed in the bottom surface 101*b* of the housing 101 is generally the same as the diameter of the base 103*a*. The suction layer 103*e* is exposed downward via the notch 111*a* so that the bottom surface of the suction layer 103*e* tightly adheres to the attachment surface of the dashboard 13 or the like.

Figure 6:
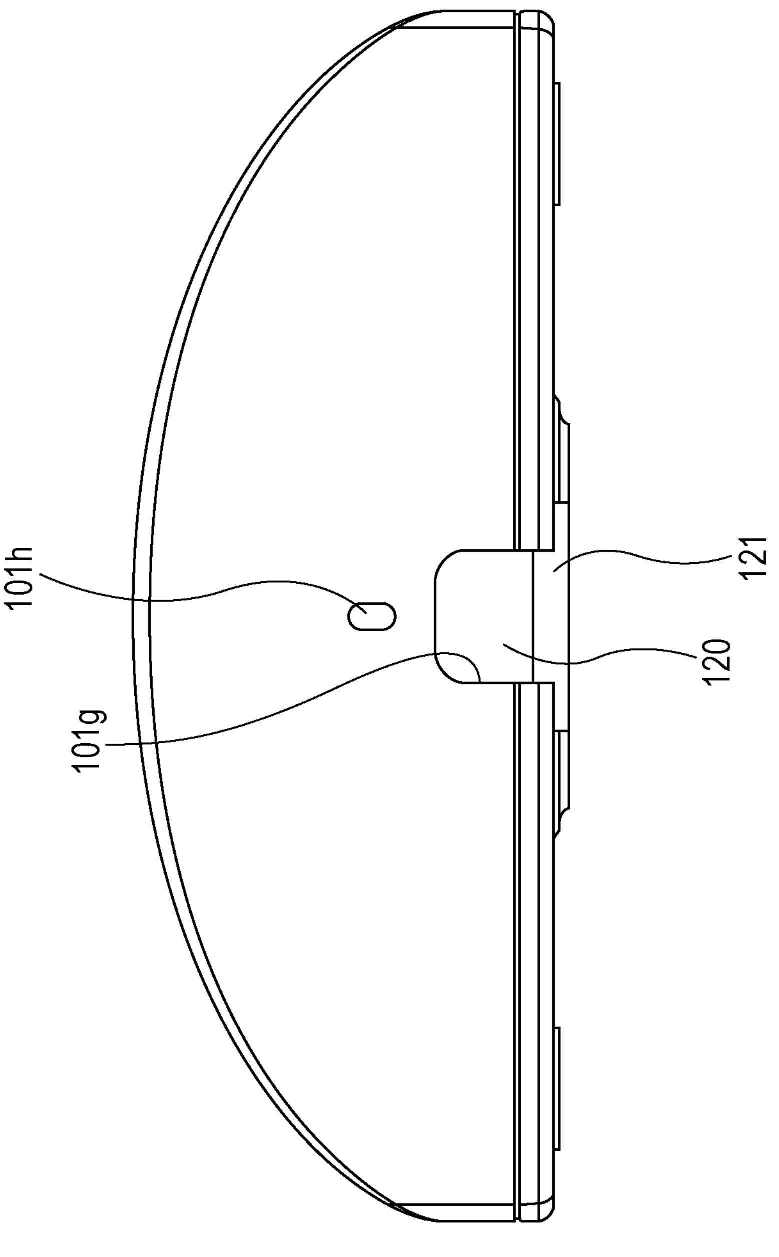
FIG. 6 is a back view illustrating an example of the appearance of the playback device according to the first embodiment.

FIG. 6 is a back view of the playback device 100. An opening 101*g* that communicates with the housing space which houses the vibration unit 120 is formed in the peripheral surface 101*c* of the housing 101 on the back side. A hole 101*h* is formed generally in the center of the peripheral surface 101*c* on the back side. The power cable 107 extends from the hole 101*h*. A generally circular rubber sheet 121, for example, is attached to the bottom surface of the vibration unit 120 housed inside the housing 101. The rubber sheet 121 is a member that allows the bottom surface of the vibration unit 120 to be uniformly placed on the attachment surface. The member is not necessarily limited to a rubber sheet, and may be any member that has a certain elasticity.

In the case where the rubber sheet 121 is attached to the vibration unit 120, the bottom surface of the rubber sheet 121 serves as the abutment surface. The term "abutment surface" means a surface over which the vibration unit 120 contacts the attachment surface, for example. In the case where the rubber sheet 121 may not be attached, the bottom surface of the vibration unit 120 serves as the abutment surface.

Figure 7:
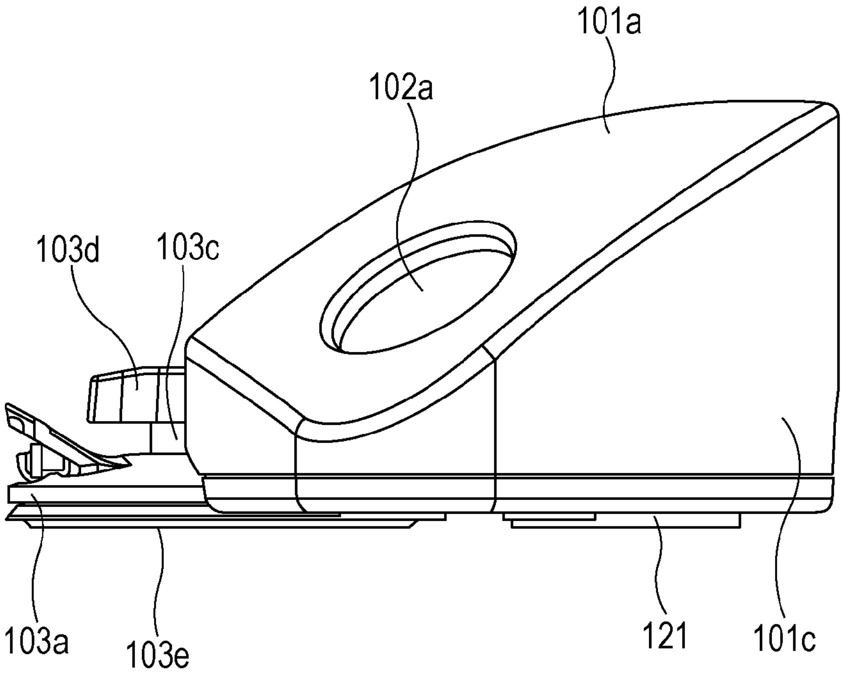
FIG. 7 is a right side view illustrating an example of the appearance of the playback device according to the first embodiment.
Figure 8:
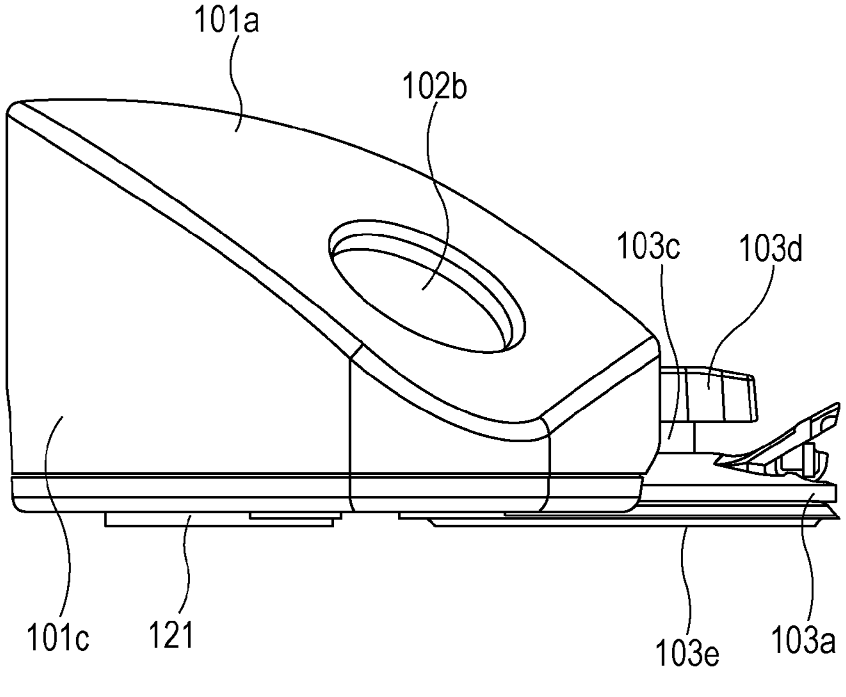
FIG. 8 is a left side view illustrating an example of the appearance of the playback device according to the first embodiment.

FIG. 7 is a right side view of the playback device 100. FIG. 8 is a left side view of the playback device 100. The components illustrated in FIGS. 7 and 8 have been described already, and therefore will not be described repeatedly.

Figure 9:
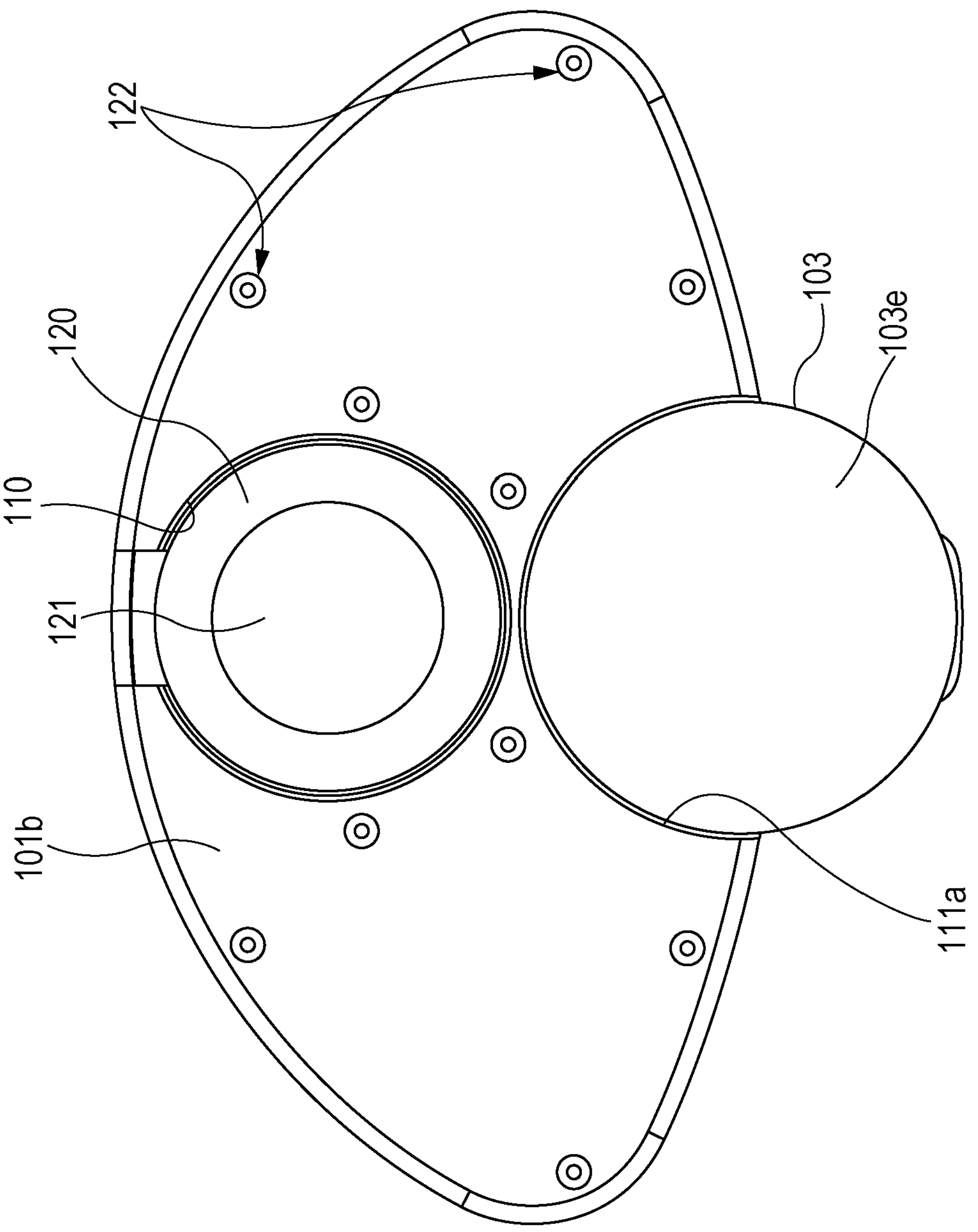
FIG. 9 is a bottom view illustrating an example of the appearance of the playback device according to the first embodiment.

FIG. 9 is a bottom view of the playback device 100. The bottom surface 101*b* of the housing 101 is fixed with respect to the top surface 101*a* and the peripheral surface 101*c* using a plurality of screws denoted by reference numeral 122. The bottom surface of the vibration unit 120 and the bottom surface of the rubber sheet 121 attached to the bottom surface of the vibration unit 120 are exposed via the generally circular notch 110 formed in the bottom surface 101*b*. In addition, the bottom surface of the suction layer 103*e* of the suction cup 103 is exposed via the notch 111*a* etc. formed in the bottom surface 101*b*. The suction cup 103 is attached such that the bottom surface of the suction layer 103*e* tightly adhering to a first position on the surface of the dashboard 13. Further, the bottom surface of the rubber sheet 121 abuts against a second position on the surface of the dashboard 13. The first and second positions are proximate to each other on the dashboard 13, for example.

Figure 10:
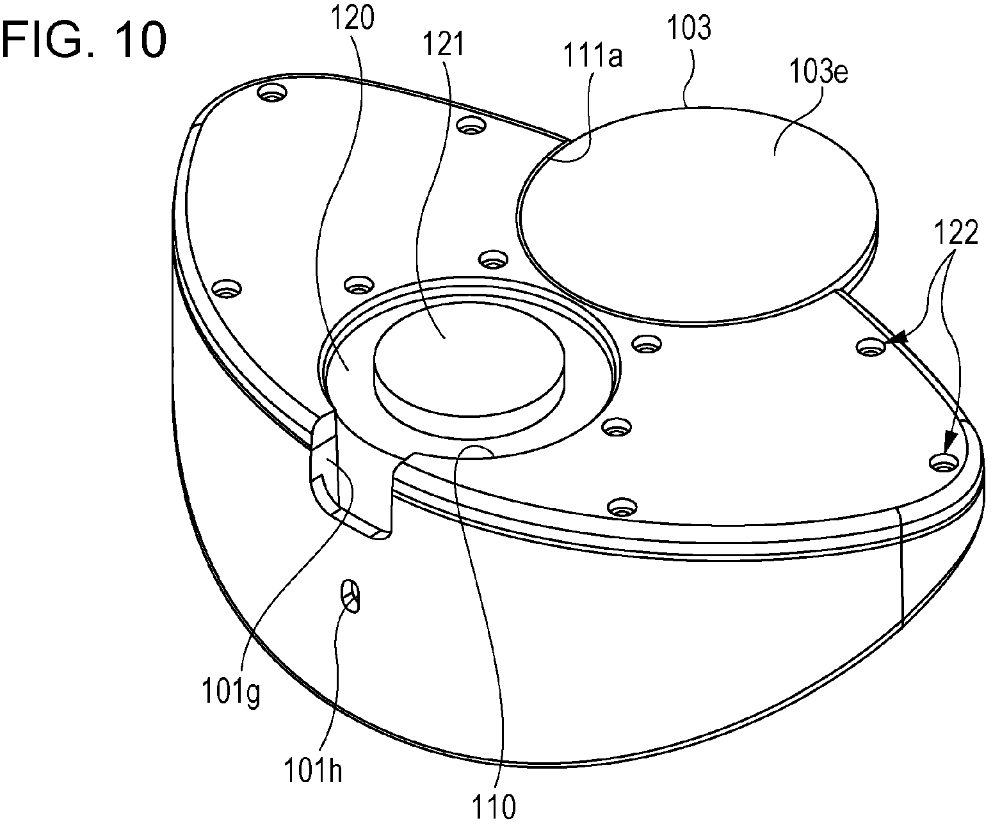
FIG. 10 is a perspective view illustrating an example of the appearance of the playback device according to the first embodiment, as seen from the bottom side.
Figure 11:
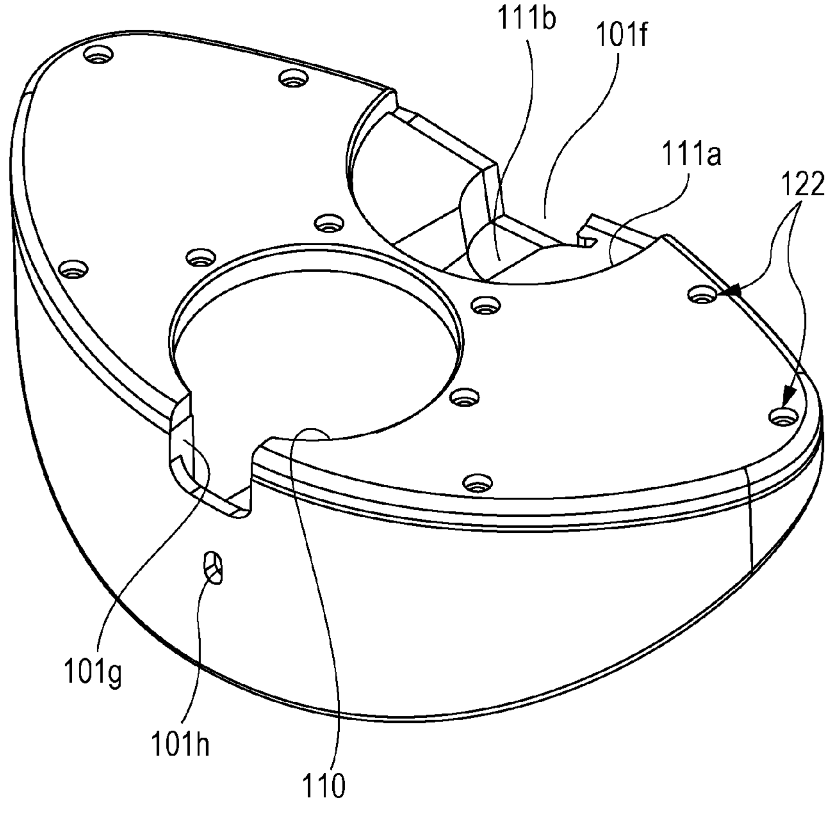
FIG. 11 is a perspective view illustrating an example of the appearance of the playback device according to the first embodiment with a vibration unit and a suction cup removed, as seen from the bottom side.

FIG. 10 is a perspective view of the playback device 100 as seen from the bottom side. FIG. 11 is a perspective view of the playback device 100 with the vibration unit 120 and the suction cup 103 removed, as seen from the bottom side. In the state illustrated in FIG. 11, the tightly sealed space which functions as an enclosure is formed inside the housing 101. A cushioning member such as a rubber ring may be attached to the bottom surface 101*b*.

Figure 12B:
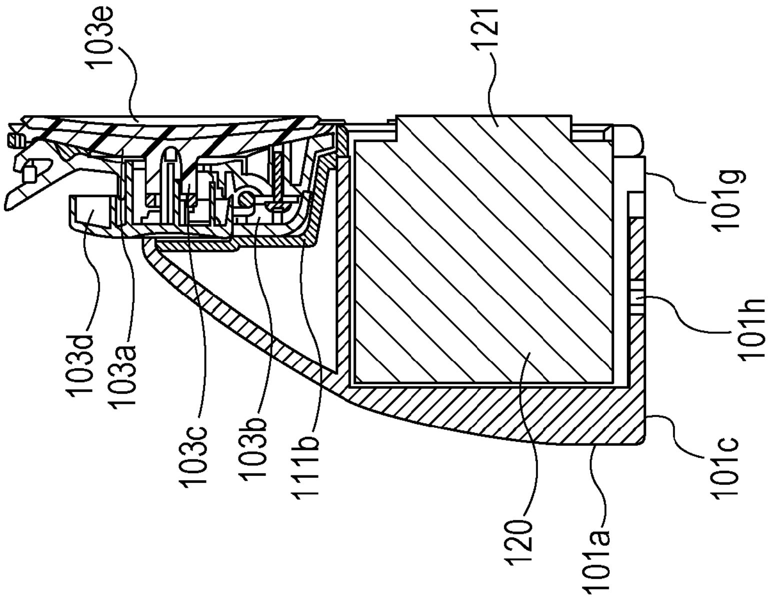
FIGS. 12A and 12B illustrate an example of a cross section of the playback device according to the first embodiment.
Figure 12A:
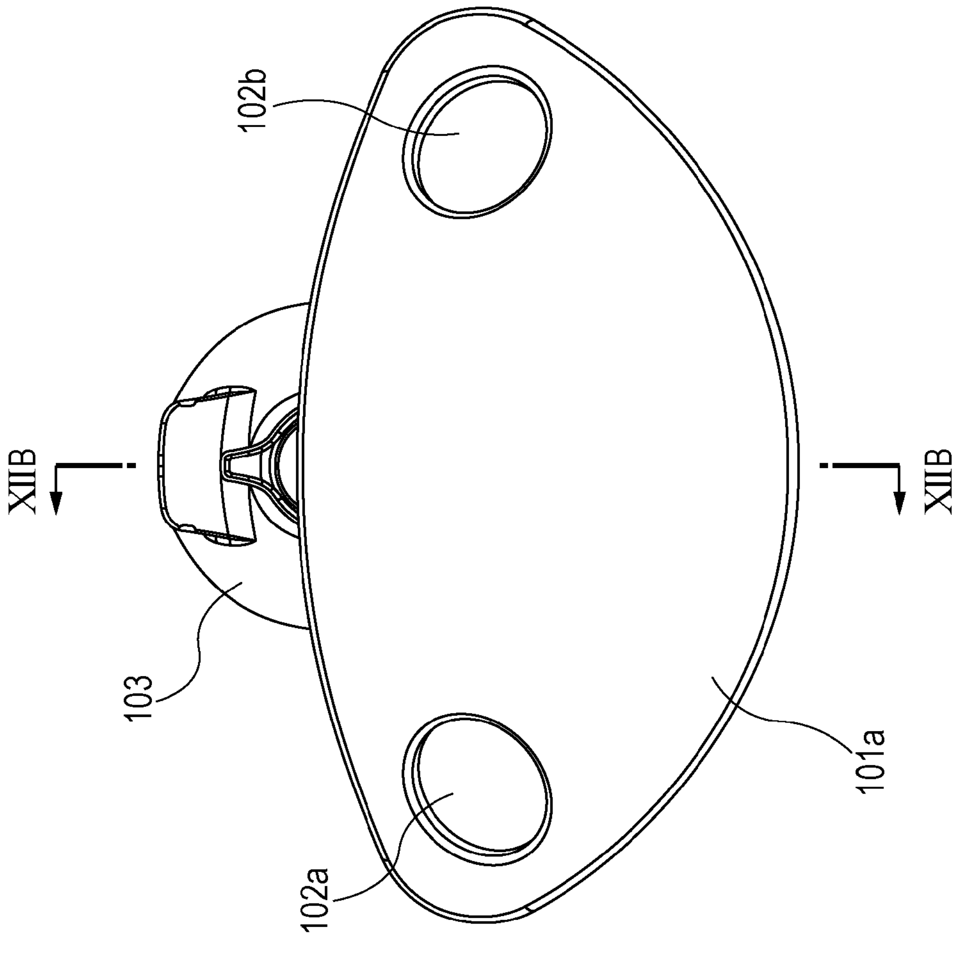

FIG. 12B illustrates an example of a cross section of the playback device 100 taken along the cutting-plane line XIIB-XIIB illustrated in FIG. 12A. The housing portion which houses the vibration unit 120 is formed by inner walls of the top surface 101*a* and the peripheral surface 101*c*. The vibration unit 120 is housed in the housing portion so as to be able to vibrate. Further, the projecting portion 103*b* of the suction cup 103 is inserted into the recessed portion 111*b*. With the projecting portion 103*b* inserted into the recessed portion 111*b*, the suction cup 103 and the housing 101 are engaged with each other with a strength enough to prevent the projecting portion 103*b* from being extracted from the recessed portion 111*b* by vibration of the vibration unit 120.

When the vibration unit 120 is housed in the housing portion inside the housing 101, the abutment surface of the vibration unit 120 is disposed slightly below the bottom surface 101*b*. When the housing 101 is placed at a predetermined location, the abutment surface of the vibration unit 120 abuts against the surface of the dashboard 13.

Although the configuration of the playback device 100 has been described above, the playback device 100 discussed above is exemplary, and the configuration of the playback device 100 may be changed as appropriate. For example, the shape of the housing 101 of the playback device 100, the vibration unit 120, the suction cup 103, etc. may be changed as appropriate. In addition, a mechanism that allows the housing 101 to be attached to the suction cup 103 etc. may also be changed as appropriate.

"Suction Cup"

Figure 13:
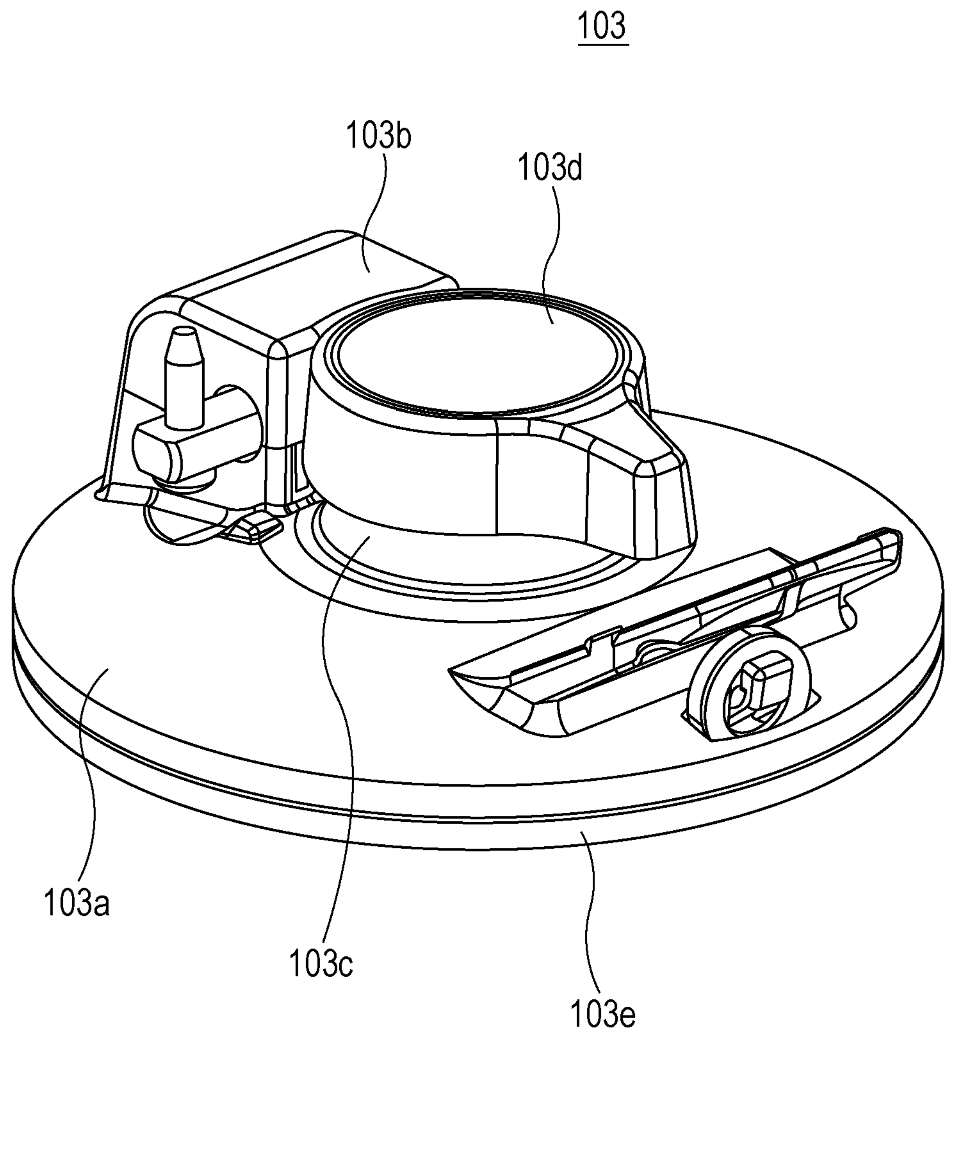
FIG. 13 is a perspective view illustrating an example of the suction cup.

FIG. 13 illustrates an example of the appearance of the suction cup 103. FIG. 13 illustrates the appearance of the suction cup 103 with the suction layer 103*e* of the suction cup 103 attached to the dashboard 13 or the like. The main configuration of the suction cup 103 will be described. The suction cup 103 includes the base 103*a* which has a generally disc-like shape, for example. The base 103*a* is formed from a synthetic resin material having an elasticity, for example. Examples of the synthetic resin material include urethane, styrene, and silicon resins.

The suction layer 103*e* formed as a gel layer, for example, is formed on the bottom surface of the base 103*a*. As the gel forming the suction layer 103*e*, gels based on synthetic resins such as polyethylene, styrene, and silicon resins may be used. The base 103*a* and the suction layer 103*e* are deformed by a force applied from the outside.

The suction cup 103 includes the projecting portion 103*b* which projects upward from a location near an end portion of the base 103*a*. As discussed above, the projecting portion 103*b* is inserted into the recessed portion 111*b* formed inside the housing 101.

The center shaft 103*c* stands straight upward generally from the center of the base 103*a*. The center shaft 103*c* is a member having a rigidity made of a metal, a hard synthetic resin, or the like. The lock lever 103*d* is formed generally at the distal end of the center shaft 103*c*. The lock lever 103*d* is coupled to the center shaft 103*c* so as to be immovable in the axial direction and rotatable in the circumferential direction of the center shaft 103*c* between an initial position and a lock position.

"Method of Attaching Playback Device"

Next, a method of attaching the playback device 100 will be described. During normal use, the housing 101 is tightly sealed, and the vibration unit 120 is housed inside the housing 101. The user brings the housing 101 housing the vibration unit 120 and the suction cup 103 into a vehicle, for example.

The playback device 100 is attached to the surface of the dashboard 13 of the vehicle, which serves as an example of the attachment surface. The location of attachment of the playback device 100 is not limited to the surface of the dashboard, and the playback device 100 may be attached to the surface of a desk. It should be noted, however, that the attachment surface is preferably a flat surface so that the playback device 100 is attached stably.

First, the suction cup 103 is attached to the surface of the dashboard 13. An example of a method of attaching the suction cup 103 to the surface of the dashboard 13 will be described with reference to FIGS. 14A to 14C. In the suction cup 103 before attachment, as illustrated in FIG. 14A, a surface on one side in the thickness direction is projected, and a surface on the suction side is recessed.

Figure 14A:
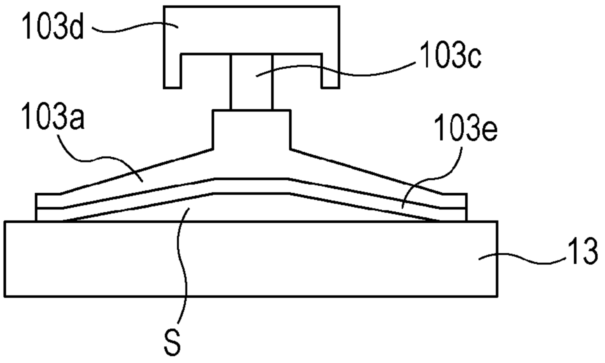
FIGS. 14A, 14B, and 14C illustrate an example of a method of attaching the suction cup.

As illustrated in FIG. 14A, the suction cup 103 is placed on the surface of the dashboard 13. A space S is formed between the suction layer 103*e* of the suction cup 103 and the surface of the dashboard 13. In this state, the lock lever 103*d* is disposed in the initial position.

Figure 14B:
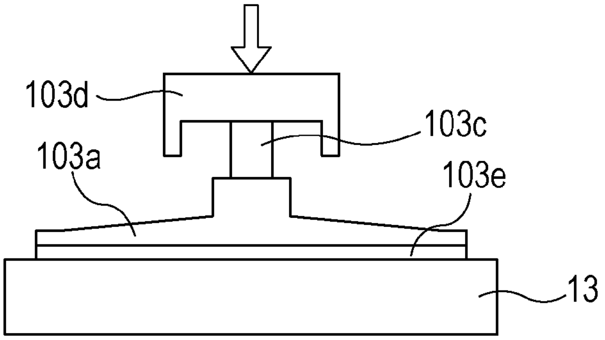

As illustrated in FIG. 14B, the top surface of the lock lever 103*d* is depressed. This causes the base 103*a* and the suction layer 103*e* to be deformed so that the bottom surface (suction surface) of the suction layer 103*e* and the surface of the dashboard 13 tightly adhere to each other. With the suction surface of the suction layer 103*e* and the surface of the dashboard 13 tightly adhering to each other, air in the space S is discharged outside the space S.

Figure 14C:
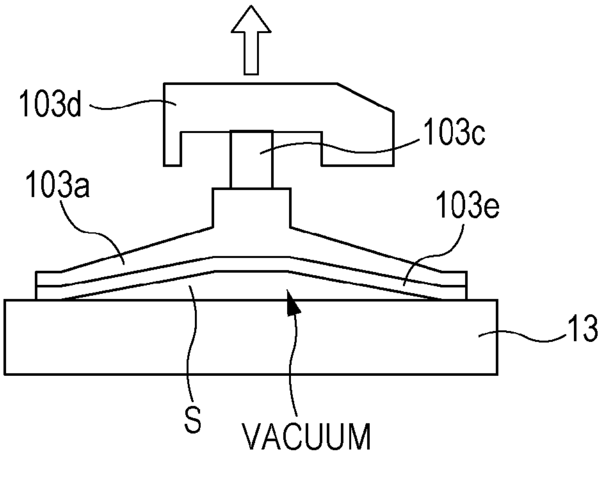

As illustrated in FIG. 14C, an operation is performed to rotate the lock lever 103*d* from the initial position to the lock position. In response to the operation, the base 103*a* and the suction layer 103*e* are deformed so as to be partially lifted, forming a space S between the suction layer 103*e* and the dashboard 13. Since air has already been discharged as discussed above, the space S is generally in a vacuum. The suction cup 103 tightly adheres to the surface of the dashboard 13 because of a difference in pressure between the space S and a space outside the space S.

Next, the housing 101 is attached to the suction cup 103 attached to the surface of the dashboard 13. For example, the recessed portion 111*b* formed inside the housing 101 and the projecting portion 103*b* of the suction cup 103 are positioned with respect to each other, and the housing 101 is pushed into the suction cup 103 to insert the projecting portion 103*b* into the recessed portion 111*b*.

With the projecting portion 103*b* inserted into the recessed portion 111*b*, the housing 101 and the suction cup 103 are engaged with each other with a predetermined strength. The term "predetermined strength" means a strength enough to maintain engagement between the housing 101 and the suction cup 103 when the vibration unit 120 vibrates in accordance with the low-register audio signal, for example. When the housing 101 and the suction cup 103 are engaged with each other with a predetermined strength, the playback device 100 can be prevented from moving on the dashboard 13 along with vibration of the vibration unit 120.

"Position Adjustment Mechanism"

In the case where the playback device 100 is attached to the surface of the dashboard 13, it is necessary to reliably transmit vibration of the vibration unit 120 to the dashboard 13. The attachment surface may be dented or curved, depending on the shape of the dashboard 13. Therefore, it is necessary to cause the abutment surface of the vibration unit 120 to reliably abut against the surface of the dashboard 13. In consideration of this point, the playback device 100 may be provided with a position adjustment mechanism that adjusts the height of the vibration unit 120. Adjusting the height of the vibration unit 120 may adjust the position of the abutment surface in a direction that is generally orthogonal to the surface of the dashboard 13.

Figure 15:
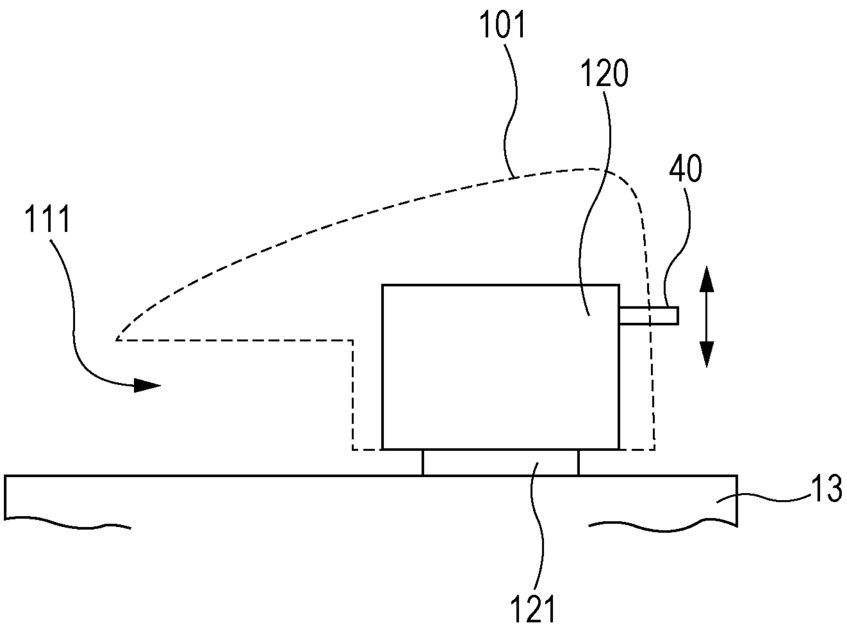
FIG. 15 illustrates an example of a position adjustment portion.
Figure 16A:
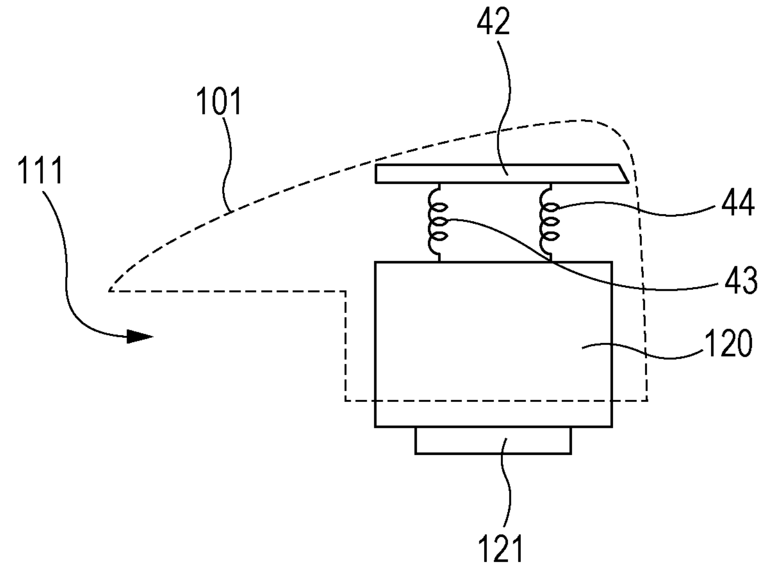
FIGS. 16A and 16B illustrate another example of the position adjustment portion.
Figure 16B:
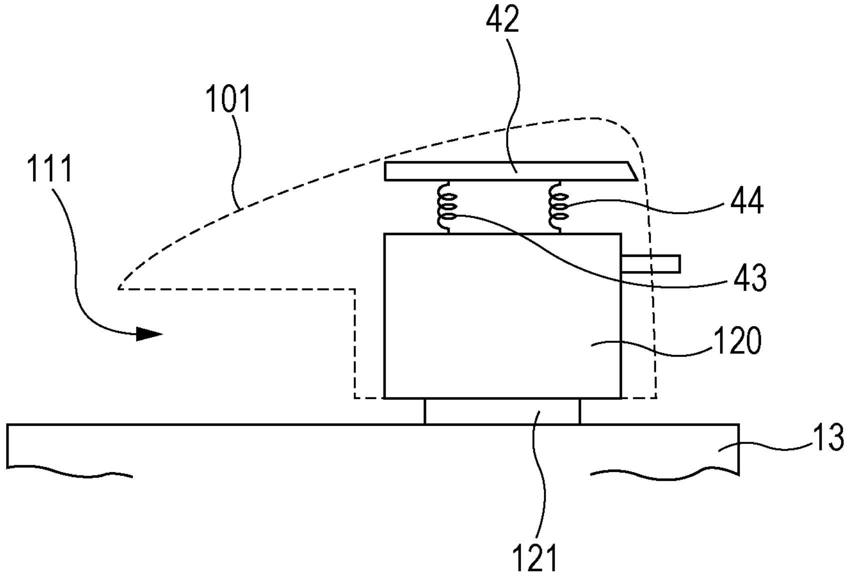

As illustrated in FIG. 15, the playback device 100 is provided with a lever 40 that allows adjustment of the height of the vibration unit 120 (including the rubber sheet 121) housed inside the housing 101, for example. In FIG. 15 and FIGS. 16A and 16B to be discussed later, the cross section of the housing 101 is illustrated in a simplified manner by the dotted line, and the suction cup 103 etc. is not illustrated.

The lever 40 is slidable in the vertical direction, for example. The user slides the lever 40 to adjust the position of the vibration unit 120 in the vertical direction, allowing the abutment surface (in the example, the bottom surface of the rubber sheet 121) of the vibration unit 120 to reliably abut against the surface of the dashboard 13. Therefore, vibration of the vibration unit 120 is reliably transmitted to the dashboard 13.

As illustrated in FIG. 16A, for example, the vibration unit 120 may be attached to the inner wall of the housing 101 via an expandable elastic member such as a spring. For example, a plate-like attachment member 42 is provided inside the housing 101. An upper portion of the vibration unit 120 is attached to the attachment member 42 via a spring 43 and a spring 44. In this state, the abutment surface of the vibration unit 120 is disposed at a position slightly below the bottom surface of the suction layer 103*e* of the suction cup 103.

As illustrated in FIG. 16B, the housing 101 is attached to the suction cup 103 attached to the surface of the dashboard 13. At this time, a stress from the dashboard 13 is applied to the abutment surface of the vibration unit 120. The spring 43 and the spring 44 are contracted in accordance with the applied stress, and the vibration unit 120 is moved upward to be stopped. The vibration unit 120 is stopped with the abutment surface of the vibration unit 120 reliably abutting against the surface of the dashboard 13. It is not necessary for the user to adjust the position of the vibration unit 120. The spring 43 and the spring 44 may be replaced with other members such as a rubber member, for example.

"Electrical Configuration of Playback Device"

Figure 17:
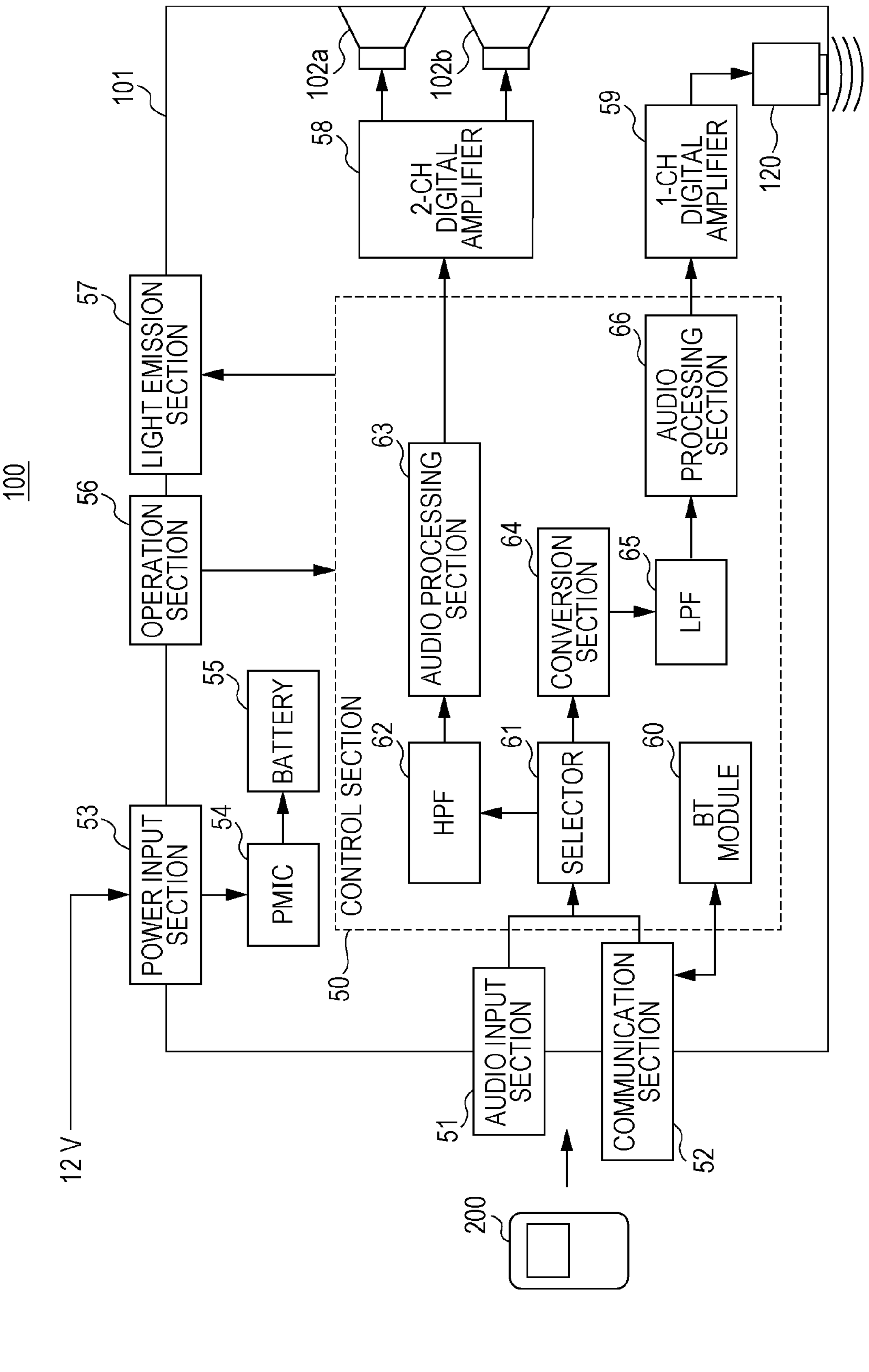
FIG. 17 is a block diagram illustrating an example of the electrical configuration of the playback device.

FIG. 17 illustrates an example of the electrical configuration of the playback device 100. The electrical components described below are housed inside the housing 101. The playback device 100 includes a control section 50, an audio input section 51, a communication section 52, a power input section 53, a power management integrated circuit (PMIC) 54, a battery 55, an operation section 56, a light emission section 57, a 2-channel (ch) digital amplifier 58, and a 1-channel (ch) digital amplifier 59, for example. The control section 50 includes a Bluetooth (BT) module 60, a selector 61, a high-pass filter (referred to as "HPF" as appropriate) 62, an audio processing section 63, a conversion section 64, a low-pass filter (referred to as "LPF" as appropriate) 65, and an audio processing section 66.

The control section 50 includes a microcomputer, a digital signal processor (DSP), a central processing unit (CPU), or the like. The control section 50 may be formed from a plurality of microcomputers or the like. The control section 50 controls the various components of the playback device 100. For example, the control section 50 controls processes including a process performed on an audio signal supplied from an external device and a process related to Bluetooth. Although not illustrated, a read-only memory (ROM) that stores a program executed by the control section 50 and a random-access memory (RAM) used as a work area or the like are connected to the control section 50.

The components of the control section 50 will be described. The BT module 60 executes processes including a process related to Bluetooth. The BT module 60 performs control related to a process for pairing with the portable terminal 200 to be discussed later and transfer of an audio signal performed after pairing has been established. The BT module 60 is connected to the communication section 52 to transmit and receive data and a command to and from the portable terminal 200 via the communication section 52.

The selector 61 selects one of respective audio inputs for the audio input section 51 and the communication section 52. The audio signal selected by the selector 61 is supplied to each of the HPF 62 and the conversion section 64.

The HPF 62 extracts a mid-to-high-register component of the audio signal. For example, the HPF 62 extracts a component at 1000 hertz (Hz) or higher from among frequency components in an audible band. An audio signal for a mid-to-high register is supplied to the audio processing section 63.

The audio processing section 63 performs various signal processing on the audio signal supplied from the HPF 62. The audio processing section 63 executes a process for converting the audio signal supplied from the HPF 62 from an analog signal into a digital signal, and a phase adjustment process, an effect process, an equalizing process, etc. on the audio signal which has been converted into a digital signal. The audio signal processed by the audio processing section 63 is supplied to the digital amplifier 58.

The digital amplifier 58 amplifies the supplied audio signal with a predetermined amplification factor. The amplifier is not limited to a digital amplifier, and may be an analog amplifier. The amplified audio signal for the L channel is converted into an analog signal. The analog audio signal is supplied to the speaker 102*a* to be played back. The amplified audio signal for the R channel is converted into an analog signal. The analog audio signal is supplied to the speaker 102*b* to be played back.

The conversion section 64 converts a 2-channel stereo signal supplied from the selector 61 into a 1-channel monaural signal. The audio signal which has been converted into a monaural signal is supplied to the LPF 65. The LPF 65 extracts a low-register component of the audio signal supplied from the conversion section 64. For example, the LPF 65 extracts a frequency component at lower than 1000 Hz from the audio signal. The audio signal extracted by the LPF 65 is supplied to the audio processing section 66.

The audio processing section 66 performs various signal processing on the audio signal supplied from the LPF 65. The audio processing section 66 executes a process for converting the audio signal supplied from the LPF 65 from an analog signal into a digital signal, and a phase adjustment process, an effect process, an equalizing process, etc. for the audio signal which has been converted into a digital signal. The audio signal processed by the audio processing section 66 is supplied to the digital amplifier 59.

The digital amplifier 59 amplifies the supplied audio signal with a predetermined amplification factor. The amplifier is not limited to a digital amplifier, and may be an analog amplifier. The low-register audio signal amplified by the digital amplifier 59 is supplied to the vibration unit 120. The vibration unit 120 vibrates in accordance with the supplied audio signal. The dashboard 13 to which the vibration unit 120 is attached vibrates along with vibration of the vibration unit 120.

Components other than the control section 50 will be described. The audio input section 51 is a hole for insertion of a cable plug, for example, and is disposed in the surface of the housing 101. The audio input section 51 is used in the case where an audio signal is supplied from the portable terminal 200 via a cable.

The communication section 52 is a component for communication with the portable terminal 200 or the like. A part of the communication section 52 is exposed from the housing 101 toward the outside. The communication section 52 includes an antenna, for example. Processes for communication (such as a modulation/demodulation process and an error correction process, for example) may be performed by the communication section 52 or the BT module 60 of the control section 50.

The power input section 53 corresponds to the power cable 107 and the socket 108 discussed above. The power input section is supplied with electric power supplied from the vehicle system. For example, a voltage at 12 V is supplied from the vehicle system to the power input section 53. The supplied voltage is supplied to the PMIC 54.

The PMIC 54 executes control related to electric power. For example, the PMIC 54 converts a voltage supplied from the power input section 53 into a voltage supported by the battery 55. Further, the PMIC 54 controls charge and discharge of the battery 55 by charge and discharge schemes corresponding to the battery 55.

The battery 55 is a chargeable secondary battery, for example. The battery 55 may be a primary battery, a solar battery, or a combination of a secondary battery, a solar battery, etc. Electric power is supplied from the battery 55 to various components of the playback device 100.

The operation section 56 includes a collection of operation input portions such as switches and buttons. Examples of the operation section 56 include a power button, a button for volume adjustment, and a button operable to establish pairing to be discussed later. The operation section 56 may be formed from a remote control device that allows a remote operation of the playback device 100. In order to secure the safety in driving the vehicle, the operation section 56 may allow the driver to provide a voice command to the playback device 100.

In response to an operation on the operation section 56, the operation section 56 generates a predetermined operation signal, and supplies the generated operation signal to the control section 50. The control section 50 executes control in accordance with the operation signal.

The light emission section 57 is a light emitting diode (LED) attached to the housing 101, for example. The light emission section 57 includes an LED that indicates whether the power source is turned on or off, for example. The light emission section 57 may emit light in a predetermined light emission mode during the pairing process. Light emission from the light emission section 57 is controlled by the control section 50, for example.

An overview of operation of the playback device 100 will be described. The playback device 100 is attached to the dashboard 13 as discussed above. Next, a pairing process is performed between the playback device 100 and the portable terminal 200 to pair the playback device 100 and the portable terminal 200 with each other. The pairing process is performed under control by the BT module 60. After pairing is established, an audio signal is supplied from the portable terminal 200 to the playback device 100. The audio signal is input to the communication section 52, for example.

The audio signal input to the communication section 52 is subjected to a process performed by the control section 50 and an amplification process performed by the digital amplifiers 58 and 59. Sound based on an audio signal for a mid-to-high register is played back from the speakers 102*a* and 102*b* toward the windshield 12. The sound based on the audio signal for a mid-to-high register is reflected by the windshield 12 to be heard by the driver etc.

An audio signal for a low register is supplied to the vibration unit 120. The vibration unit 120 vibrates in accordance with the audio signal for a low register. The dashboard 13 vibrates in accordance with vibration of the vibration unit 120. Vibration of the dashboard 13 causes sound based on the audio signal for a low register to be played back in the vehicle.

"Electrical Configuration of Portable Terminal"

Figure 18:
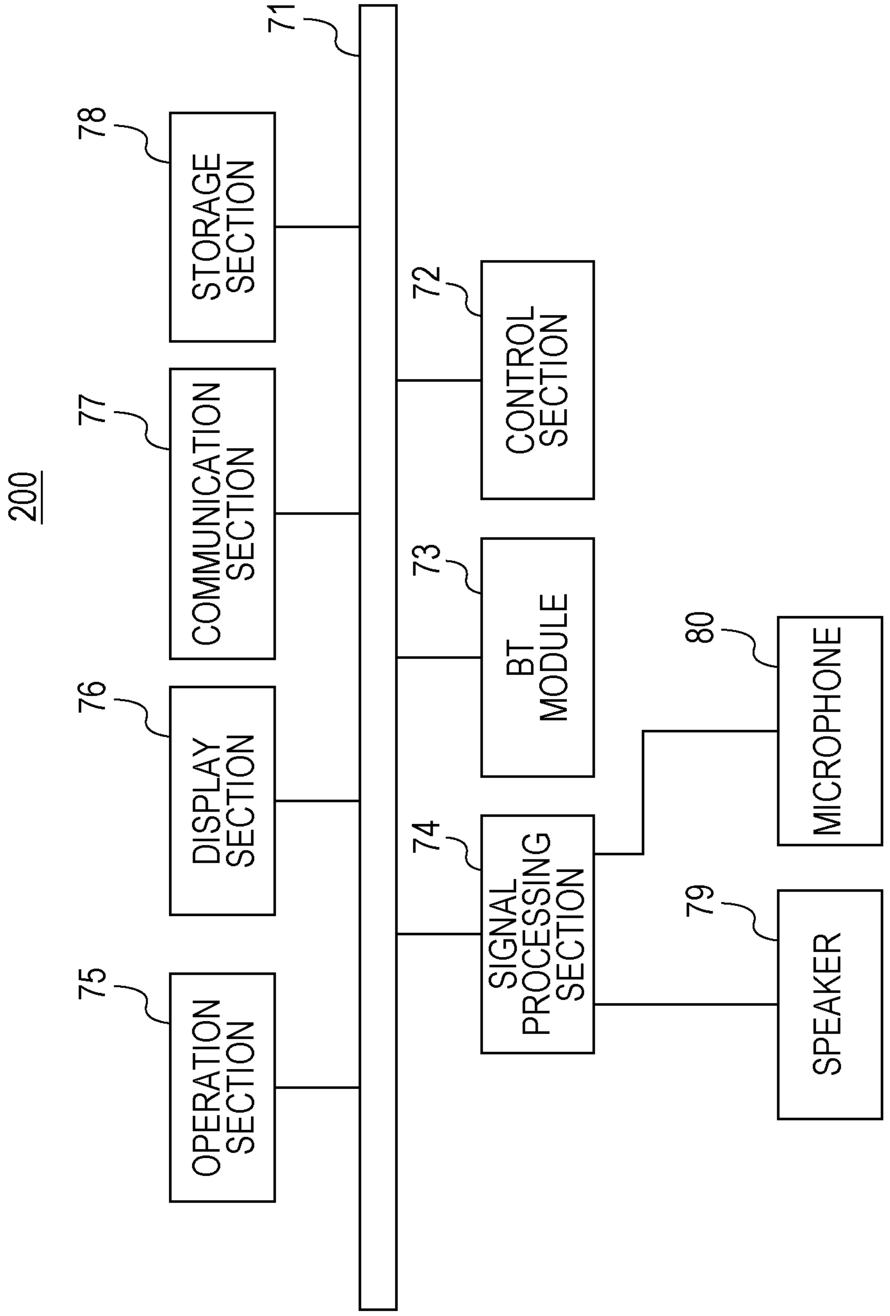
FIG. 18 is a block diagram illustrating an example of the electrical configuration of a portable terminal.

FIG. 18 illustrates an example of the configuration of the portable terminal 200. The portable terminal 200 includes a data bus 71. A control section 72, a BT module 73, a signal processing section 74, an operation section 75, a display section 76, a communication section 77, and a storage section 78 are connected to the data bus 71.

The control section 72 includes a CPU, a RAM, a ROM, etc., for example. The ROM stores a program read by the CPU for operation. The RAM is used as a work memory of the CPU. The CPU executes various processes in accordance with the program stored in the ROM to control various portions and the entirety of the portable terminal 200.

The BT module 73 is a module that executes a process related to Bluetooth. For example, the BT module 73 executes a process based on a Bluetooth communication standard such as a process for pairing with the playback device 100. Such processes may be performed by the control section 72. An application that enables the process based on the Bluetooth communication standard is installed in the portable terminal 200.

The signal processing section 74 includes a modulator/demodulator, an analog-to-digital (A/D) converter, a digital-to-analog (D/A) converter, a sound codec, etc. The modulator/demodulator of the signal processing section 74 modulates a sound signal to be transmitted, and demodulates a received signal. The signal to be transmitted is converted into a digital signal by the A/D converter. The received signal is converted into an analog signal by the D/C converter. A speaker 79 that outputs sound and a microphone 80 that allows input of sound are connected to the signal processing section 74.

The operation section 75 is an input unit that allows the user to make various types of input to the portable terminal 200. The operation section 75 is composed of a button, a touch screen, a switch, etc., for example. In addition, the operation section 75 may be formed integrally with the display section 76 as a touch screen. When an input operation is provided to the operation section 75 by the user, a control signal corresponding to the input operation is generated, and the generated control signal is output to the control section 72. Then, the control section 72 performs a computation process and control corresponding to the control signal.

The display section 76 is a display unit formed as an LCD, an organic EL panel, or the like, for example. The display section 76 displays a menu of various operations of the portable terminal 200, and displays a menu screen in which a plurality of icons are arranged, a list of music tunes, information on a music tune being played back (such as the artist name and the tune title), a movie content, an image content, etc.

The communication section 77 is a communication module that allows communication with the playback device 100 on the basis of a Bluetooth communication standard, for example. Data and a command generated by the BT module 73 are transmitted to the playback device 100 via the communication section 77. Further, audio data stored in the portable terminal 200 are transmitted to the playback device 100 via the communication section 77.

The storage section 78 is formed as a mass storage medium such as an HDD and a flash memory, for example. The storage section 78 stores content data such as music tunes to be played back by the portable terminal 200. The storage section 78 stores audio data in the WAV (RIFF waveform Audio Format) or as compressed using an audio compression scheme such as MP3 (MPEG Audio Layer-3) and AAC (Advanced Audio Coding). The storage section 78 also stores music tune information including the artist name, the album title, the tune title, the total play time, and the play time information as meta data for the audio data. The music tune information may be acquired utilizing CDDB (Compact Disc Data Base). The music tune information may also be set as desired by the user.

The speaker 79 is a sound output unit that allows outputting sound. The speaker 79 outputs sound on the basis of a sound signal subjected to a predetermined process performed by the signal processing section 74. This allows the user to hear voice for a call and sound based on sound data stored in the portable terminal 200. The microphone 80 allows inputting sound to the portable terminal 200 for a call or voice command input. The sound input from the microphone 80 is subjected to a predetermined process performed by the signal processing section 74.

The portable terminal 200 is configured as described above. Although not shown, the portable terminal 200 may be configured to have a camera function implemented by an imaging section and an image processing section, a radio function, etc.

"Pairing Process"

Figure 19:
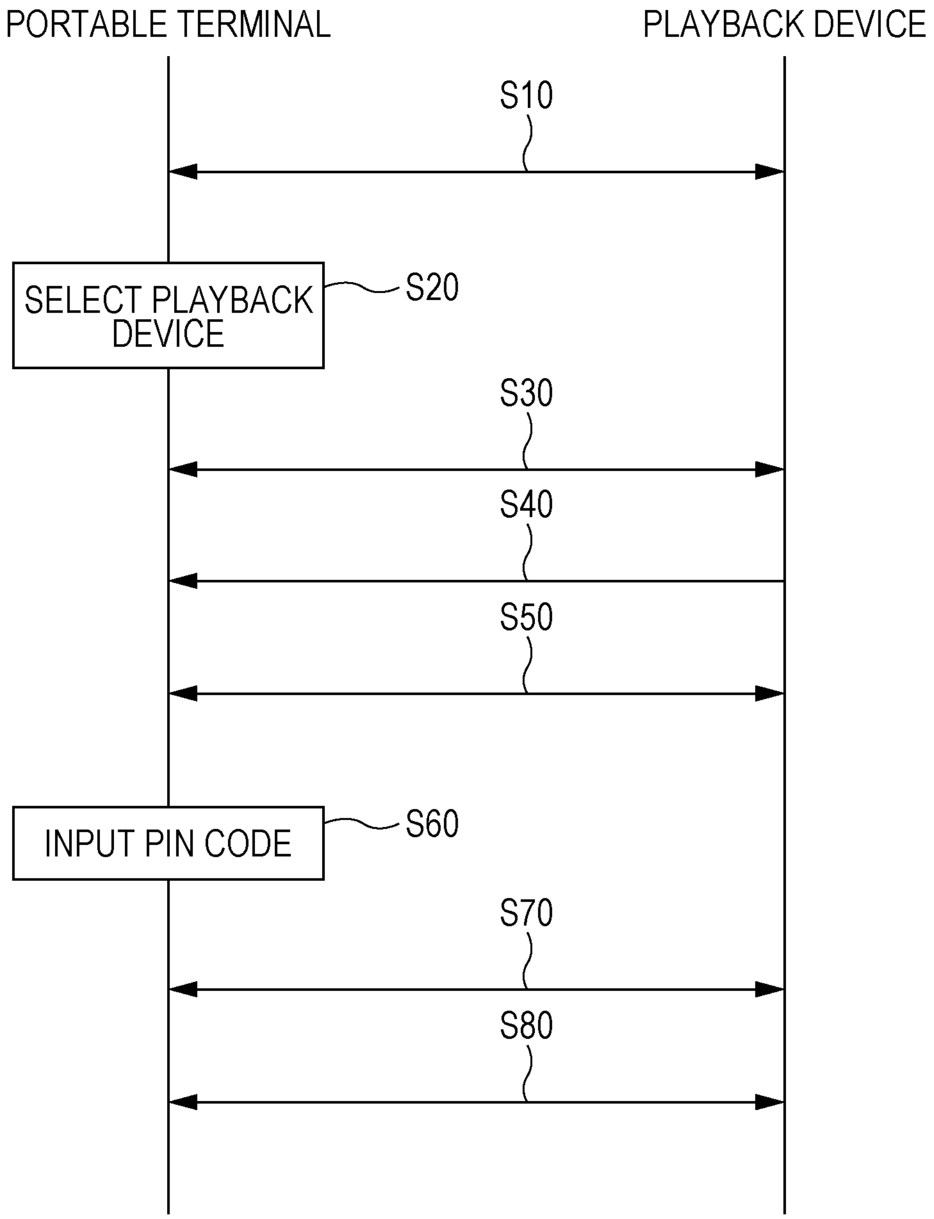
FIG. 19 is a sequence diagram illustrating an example of a pairing process performed between the playback device and the portable terminal.

FIG. 19 is a sequence diagram illustrating an example of the flow of the pairing process performed between the playback device 100 and the portable terminal 200.

In step S10, an inquiry is performed to search for a peripheral device. For example, a predetermined operation is performed on the portable terminal 200 to issue an inquiry request from the portable terminal 200 to the surroundings of the portable terminal 200. An inquiry request is a message issued during pairing to search for a device to be paired.

When the playback device 100 receives the inquiry request, the playback device 100 transmits an inquiry response. An inquiry response is a response message to notify the terminal which transmitted an inquiry request of the existence of the device which has received the inquiry request. Inquiry responses are received by the portable terminal 200. The portable terminal 200 displays devices corresponding to the received inquiry responses on the display section 76. Then, the process proceeds to step S20.

In step S20, an operation is performed to select an indication corresponding to the playback device 100 from among the devices displayed on the display section 76. Then, the process proceeds to step S30.

In step S30, PAGE is initialized in order to establish system synchronization, and thereafter a baseband ACL (Asynchronous Connection Less) link (asynchronous link) is established. Then, the process proceeds to step S40.

In step S40, an L2CAP (Logical Link Control and Adaptation Protocol) channel is established on the ACL link, and Bluetooth service information such as profile is transmitted using SDP (Service Discovery Protocol). The SDP is used by the playback device 100 and the portable terminal 200 to search for what services are supported by the mating devices. Then, the process proceeds to step S50.

In step S50, link managers of the playback device 100 and the portable terminal 200 execute a pairing process using LMP (Link Manager Protocol) on the established ACL link. The LMP is used to control connection, authentication, encryption, power-saving control, and the like of a Bluetooth connection between the two devices, and for negotiation. Then, the process proceeds to step S60.

In step S60, a PIN (Personal Identify Number) code is input using the operation section 75 of the portable terminal 200. The PIN code is a 4-digit number, for example. The PIN code is written in an operation manual of the playback device 100 or the like, for example, and has been provided to the user in advance. If the PIN code input in step S60 is correct, the process proceeds to step S70.

In step S70, a link key is generated to encrypt the baseband, completing the pairing process. Subsequently, communication is performed on the basis of the link key stored in the devices. Then, the process proceeds to step S80.

In step S80, connection is established with the profile on the basis of the acquired service information using the LMP. Further, connection is established with A2DP (Advanced Audio Distribution Profile), AVRCP (Audio/Video Remote Control Profile), and HFP (Hands Free Profile). The A2DP is used to stream stereo audio from the portable terminal 200 to the playback device 100. The AVRCP is used to remotely control audio streaming. The HFP is used to implement a hands-free call function. Connection with the HFP enables a hands-free call to be made using the playback device 100.

The pairing process between the playback device 100 and the portable terminal 200 is performed as described above. The pairing process discussed above is exemplary, and a pairing process based on a communication standard according to the related art may be performed between the playback device 100 and the portable terminal 200.

2. Second Embodiment

"Overview of Embodiment"

Figure 20:
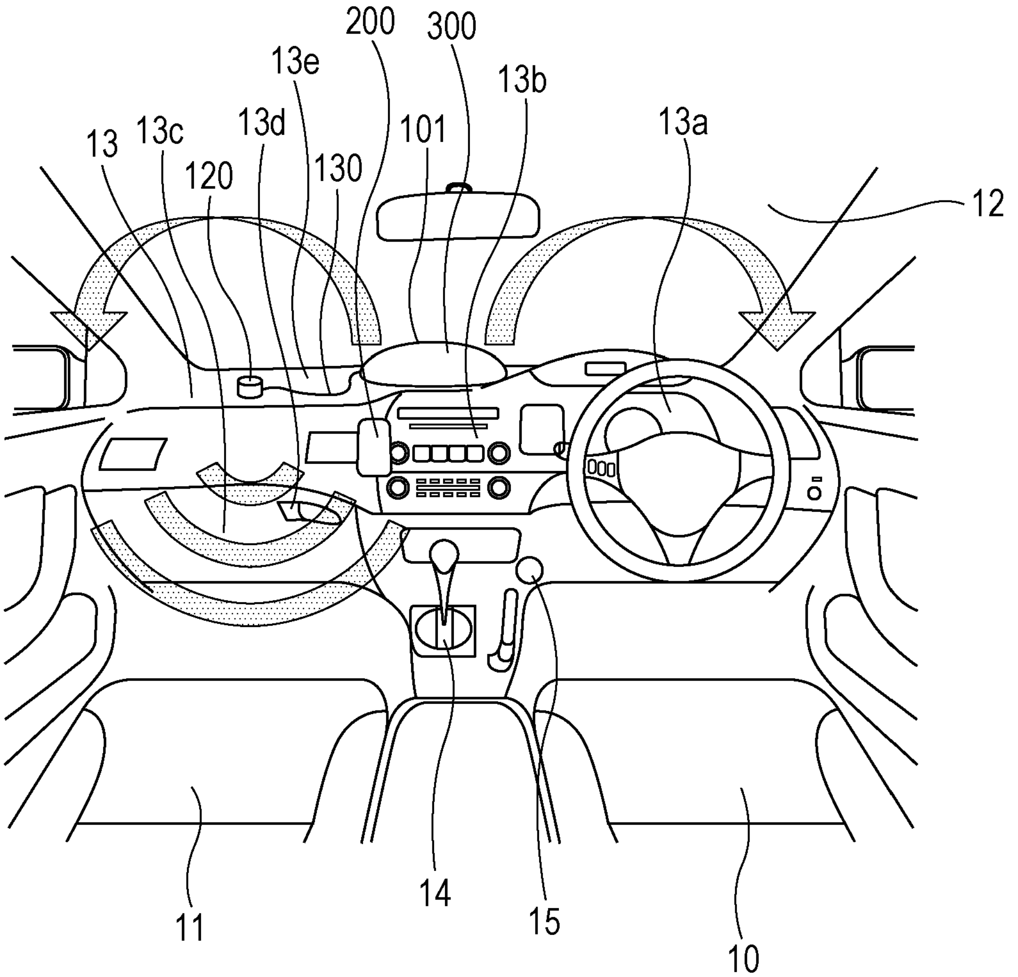
FIG. 20 illustrates an overview of a second embodiment.

Next, a second embodiment will be described. FIG. 20 illustrates an overview of the second embodiment. Components corresponding to the components described in relation to the first embodiment are denoted by the same reference numerals to omit repeated description as appropriate. For example, a playback device according to the second embodiment is referred to as a playback device 300, and components of the playback device 300 corresponding to the components of the playback device 100 are denoted by the same reference numerals.

In the second embodiment, the vibration unit 120 and the housing 101 of the playback device 300 are connected to each other via a cable 130, and extension of the cable 130 enables the vibration unit 120 to be attached outside the housing 101.

For example, the suction cup 103 is attached to the surface of the dashboard 13 generally in the center, and the housing 101 is attached to the suction cup 103. The outer extension of the housing 101 partitions the surface of the dashboard 13 into a surface positioned inside the housing 101 and a surface positioned outside the housing 101. The vibration unit 120 is placed on a surface of the dashboard 13 that is remote from the surface of the dashboard 13 generally in the center (the surface positioned outside the housing 101). Specifically, the vibration unit 120 is placed on the surface of the dashboard 13 in the vicinity of a housing space formed in the dashboard 13. The housing space formed in the dashboard 13 may be the glove compartment 13*c* discussed above, for example.

The vibration unit 120 is placed on the flat surface portion 13*e* of the dashboard 13 over the glove compartment 13*c*. An audio signal for a low register is supplied to the vibration unit 120 via the cable 130. The vibration unit 120 vibrates in accordance with the audio signal for a low register. Low sound generated by vibration of the vibration unit 120 is amplified by the glove compartment 13*c*, allowing playback of powerful low sound. Further, an audio signal for a mid-to-high register is played back from the center of the dashboard 13 toward the windshield 12, allowing mid-to-high sound to be played back with a sense of expansion.

"Playback Device"

Figure 21:
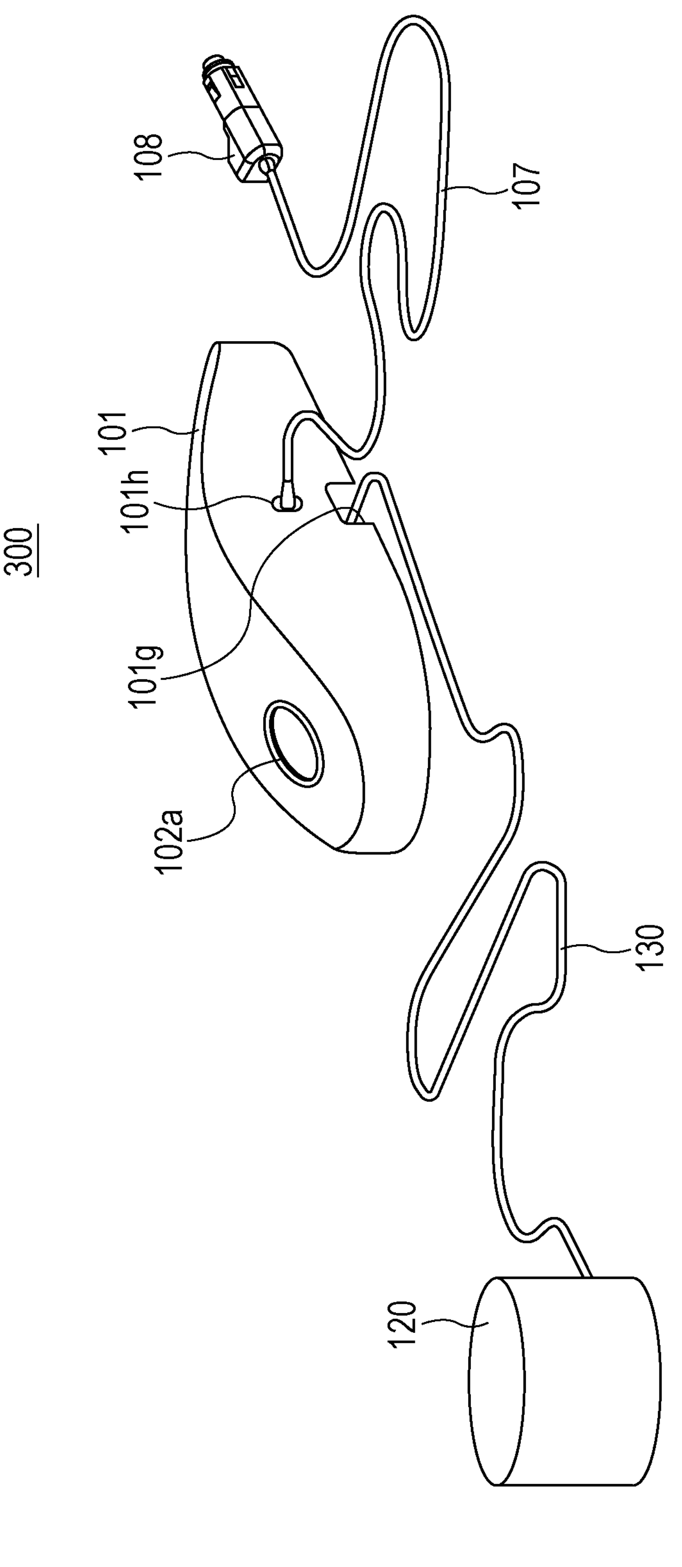
FIG. 21 is a perspective view illustrating an example of the appearance of the playback device according to the second embodiment.

FIG. 21 is a perspective view illustrating an example of the appearance of the playback device 300 as seen from the back side of the housing 101. A housing of the playback device 300 is generally similar in shape to the housing 101 of the playback device 100 according to the first embodiment.

As discussed above, the vibration unit 120 is connected to the housing 101 via the cable 130. The cable 130 extends via the opening 101*g* formed on the back side of the housing 101. The length of the cable 130 may be about 1 meter (m), for example. A mechanism that adjusts the length of the cable 130 may be provided inside the housing 101 to allow the cable 130 to extend over a desired length. Further, the cable 130 may be rewound after use of the playback device 100 so that the cable 130 is housed inside the housing 101.

Power supply to the playback device 300, the shape of the suction cup 103, the method of attaching the suction cup 103, the method of attaching the housing 101 to the suction cup 103, the pairing process performed between the playback device 300 and the portable terminal 200, the electrical configuration and operation of the playback device 300 and the portable terminal 200, etc. are the same as those in the first embodiment, and therefore repeated description will be omitted.

In the second embodiment, the vibration unit 120 may be placed on a surface in the vicinity of the glove compartment 13*c*. Vibration of the vibration unit 120 may be amplified by the glove compartment 13*c*, allowing playback of powerful low sound.

3. Modification

While embodiments of the present disclosure have been described above, the present disclosure is not limited thereto, and may be modified variously.

The number of speakers is not limited to two. Further, the arrangement, position, etc. of the speakers are changeable as appropriate as long as the speakers emit sound toward the windshield of the vehicle in the case where the housing of the playback device is attached to the dashboard. In the second embodiment discussed above, an audio signal for a low register may be wirelessly supplied to the vibration unit. In the first and second embodiments discussed above, the suction cup is first attached to the dashboard, and thereafter the housing is attached to the suction cup. However, the suction cup and the housing may be integrated with each other, and the integrated unit may be attached to the dashboard.

The configurations and the processes according to the embodiments and the modifications may be combined with each other as appropriate unless any technical contradiction occurs. The order of the processes in the process flow described above may be changed as appropriate unless any technical contradiction occurs. Further, the materials and the numerical values are exemplary, and may be selected as appropriate unless any technical contradiction occurs.

The present disclosure may be configured as follows.

(1) A playback device including: a housing: an attachment portion to a first position on an attachment surface; a speaker that plays back sound in a predetermined direction in accordance with a first audio signal having a first band; and a vibration portion that vibrates in accordance with a second audio signal having a second band that is lower than the first band, the vibration portion having an abutment surface that abuts at a second position on the attachment surface, the attachment member, the speaker, and the vibration portion being attached to the housing.

(2) The playback device according to (1), in which the attachment surface is a surface of a dashboard of a vehicle, and the speaker plays back sound toward a windshield of the vehicle.

(3) The playback device according to (1) or (2), in which the first position and the second position are proximate to each other on the attachment surface.

(4) The playback device according to (1) or (2), further including: a cable connected to the vibration portion, in which the abutment surface of the vibration portion abuts at the second position which is remote from the first position.

(5) The playback device according to (4), in which the first position is a generally center portion of a surface of a dashboard of a vehicle, and the second position is a portion of the surface of the dashboard of the vehicle in the vicinity of a housing space formed in the dashboard.

(6) The playback device according to (5), in which the second audio signal is amplified by the housing space before being played back.

(7) The playback device according to any one of (4) to (6), in which the cable is retractable into the housing.

(8) The playback device according to any one of (1) to (7), further including: an adjustment portion that adjusts a position of the abutment surface.

(9) The playback device according to any one of (1) to (7), in which the vibration portion is displaced in accordance with a stress applied from the attachment surface when the abutment surface abuts at the second position.

(10) The playback device according to any one of (1) to (9), further including: a control section that supplies the first audio signal to the speaker and that supplies the second audio signal to the vibration portion.

(11) The playback device according to (10), in which the control section generates the first audio signal and the second audio signal by performing predetermined signal processing on an audio signal supplied from a portable terminal.

(12) The playback device according to any one of (1) to (11), in which the housing is removably attached to the attachment portion.

The invention claimed is:

1. A playback device comprising:

a housing;

an attachment portion that is attached to a first position on an attachment surface;

a speaker that plays back sound in a predetermined direction in accordance with a first audio signal having a first band;

a vibration portion that vibrates in accordance with a second audio signal having a second band that is lower than the first band, the vibration portion having an abutment surface that abuts at a second position on the attachment surface; and a notch, having a shape corresponding to a shape of the vibration portion, formed in a bottom surface of the housing, wherein the vibration portion is attached to the notch and disposed in a predetermined space, the attachment portion, the speaker, and the vibration portion being attached to the housing.

2. The playback device according to claim 1, wherein the attachment surface is a surface of a dashboard of a vehicle, and the speaker plays back sound toward a windshield of the vehicle.

3. The playback device according to claim 1, wherein the first position and the second position are proximate to each other on the attachment surface.

4. The playback device according to claim 1, further comprising:

a cable connected to the vibration portion, wherein the abutment surface of the vibration portion abuts at the second position which is remote from the first position.

5. The playback device according to claim 4, wherein the first position is a center portion of a surface of a dashboard of a vehicle, and the second position is a portion of the surface of the dashboard of the vehicle in the vicinity of a housing space formed in the dashboard.

6. The playback device according to claim 5, wherein the second audio signal is amplified by the housing space before being played back.

7. The playback device according to claim 4, wherein the cable is retractable into the housing.

8. The playback device according to claim 1, further comprising: an adjustment portion that adjusts a position of the abutment surface.

9. The playback device according to claim 1, wherein the vibration portion is displaced in accordance with a stress applied from the attachment surface when the abutment surface abuts at the second position.

10. The playback device according to claim 1, further comprising: a control section that supplies the first audio signal to the speaker and the second audio signal to the vibration portion.

11. The playback device according to claim 10, wherein the control section generates the first audio signal and the second audio signal by performing predetermined signal processing on an audio signal supplied from a portable terminal.

12. The playback device according to claim 1, wherein the housing is removably attached to the attachment portion.

13. The playback device according to claim 1, wherein the predetermined space corresponds to an inner space between the notch and the upper surface of the housing.

14. The playback device according to claim 1, wherein the abutment surface abuts the attachment surface via the notch.

15. A playback device comprising:

a housing;

an attachment portion that is attached on an attachment surface at a first position;

a speaker that plays back sound in a predetermined direction in accordance with a first audio signal having a first band;

a vibration portion that vibrates in accordance with a second audio signal having a second band that is lower than the first band, the vibration portion having an abutment surface that abuts at a second position on the attachment surface; and a notch, having a shape corresponding to a shape of the vibration portion, formed in a bottom surface of the housing, wherein the vibration portion is housed in the notch and a predetermined space in the housing.

* * * * *